US011287326B2

(12) United States Patent
Capps

(10) Patent No.: US 11,287,326 B2
(45) Date of Patent: Mar. 29, 2022

(54) LED THERMAL CHARACTERIZATION AND CALIBRATION FOR AN OPTICAL DISPLAY

(71) Applicant: Magic Leap, Inc., Plantation, FL (US)

(72) Inventor: Marshall Charles Capps, Austin, TX (US)

(73) Assignee: Magic Leap, Inc., Plantation, FL (US)

(*) Notice: Subject to any disclaimer, the term of this patent is extended or adjusted under 35 U.S.C. 154(b) by 0 days.

(21) Appl. No.: 17/115,104

(22) Filed: Dec. 8, 2020

(65) Prior Publication Data

US 2021/0190598 A1 Jun. 24, 2021

Related U.S. Application Data

(63) Continuation of application No. 16/530,599, filed on Aug. 2, 2019, now Pat. No. 10,914,640.

(60) Provisional application No. 62/714,503, filed on Aug. 3, 2018.

(51) Int. Cl.
*G09G 3/32* (2016.01)
*G01J 5/60* (2006.01)
*G09G 3/20* (2006.01)

(52) U.S. Cl.
CPC .............. *G01J 5/60* (2013.01); *G09G 3/2003* (2013.01); *G09G 3/32* (2013.01); *G09G 2320/0693* (2013.01); *G09G 2360/16* (2013.01)

(58) Field of Classification Search
CPC ........... G01J 5/60; G09G 3/32; G09G 3/2003; G09G 2360/16; G09G 2320/0693; G09G 3/002; G09G 2320/0242; G09G 3/20
See application file for complete search history.

(56) References Cited

U.S. PATENT DOCUMENTS

| 8,465,335 | B2 | 6/2013 | Elliott |
| 9,851,572 | B2* | 12/2017 | Baumann ............. G02B 27/283 |
| 10,914,640 | B2 | 2/2021 | Capps |
| 2008/0252653 | A1* | 10/2008 | Alessi .................. G09G 3/3208 |
| | | | 345/589 |

(Continued)

FOREIGN PATENT DOCUMENTS

WO   2020028811 A1   2/2020

OTHER PUBLICATIONS

U.S. Appl. No. 16/530,599, "Corrected Notice of Allowability", dated Dec. 10, 2020, 3 pages.

(Continued)

*Primary Examiner* — Carolyn R Edwards
(74) *Attorney, Agent, or Firm* — Kilpatrick Townsend & Stockton LLP

(57) ABSTRACT

Techniques are disclosed for calibrating display devices, such as head-mounted augmented reality (AR) devices. For each of a set of primary color light sources disposed in a unit, measurement points are obtained including chromaticity and luminance values as a function of temperature of the unit and drive currents of the primary color light sources. The measurement points are converted to an XYZ color space to produce XYZ values. For each of a set of target luminances and a set of discrete temperatures, primary luminances are calculated for each of the set of primary color light sources, and the drive currents and the XYZ values are interpolated or extrapolated for each of the primary luminances to obtain calculated currents.

20 Claims, 15 Drawing Sheets

(56) References Cited

U.S. PATENT DOCUMENTS

2014/0198261 A1* 7/2014 Yamaguchi .......... H04N 9/3182
                                                    348/744
2015/0382424 A1* 12/2015 Knapp ................... H05B 45/20
                                                    315/307
2020/0041349 A1   2/2020 Capps

OTHER PUBLICATIONS

U.S. Appl. No. 16/530,599, "Corrected Notice of Allowability", dated Dec. 28, 2020, 3 pages.
U.S. Appl. No. 16/530,599, "Non-Final Office Action", dated Apr. 29, 2020, 11 pages.
U.S. Appl. No. 16/530,599, "Notice of Allowance", dated Sep. 8, 2020, 10 pages.
PCT/US2019/044918, "International Preliminary Report on Patentability", dated Feb. 18, 2021, 8 pages.
PCT/US2019/044918, "International Search Report and Written Opinion", dated Oct. 29, 2019, 9 pages.
Application No. EP19845507.3, Extended European Search Report, dated Oct. 27, 2021, 14 pages.
EP19845507.3, "Partial Supplemental European Search Report", dated Jul. 27, 2021, 17 pages.

\* cited by examiner

LED THERMAL CHARACTERIZATION AND CALIBRATION FOR AN OPTICAL DISPLAY

CROSS-REFERENCES TO RELATED APPLICATIONS

This application is a continuation of U.S. patent application Ser. No. 16/530,599, filed on Aug. 2, 2019, U.S. Pat. No. 10,914,640, issued on Feb. 9, 2021, entitled "LED THERMAL CHARACTERIZATION AND CALIBRATION FOR AN OPTICAL DISPLAY," which is a non-provisional of and claims the benefit of and priority to U.S. Provisional Patent Application No. 62/714,503, filed on Aug. 3, 2018, entitled "LED THERMAL CHARACTERIZATION AND CALIBRATION FOR AN OPTICAL DISPLAY," which are hereby incorporated by reference in their entirety for all purposes.

BACKGROUND OF THE INVENTION

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in these display technologies, there is a need in the art for improved methods, systems, and devices related to augmented reality systems, particularly, display systems.

SUMMARY OF THE INVENTION

The present disclosure relates generally to techniques for calibrating display devices. More particularly, embodiments of the present disclosure provide systems and methods for performing a thermal characterization and calibration of one or more light-emitting diodes (LEDs) in an augmented reality (AR) device. Although portions of the present disclosure are described in reference to an AR device, the disclosure is applicable to a variety of applications in image display systems.

In accordance with a first aspect of the present invention, a method of calibrating a display device including a set of primary color light sources disposed in a unit is provided. The method may include obtaining, for each of the primary color light sources, measurement points including chromaticity and luminance values as a function of temperature of the unit and drive currents of the primary color light sources. The method may also include converting the measurement points to an XYZ color space to produce XYZ values. The method may further include, for each of a set of target luminances and a set of discrete temperatures, calculating primary luminances for each of the primary color light sources and interpolating or extrapolating the drive currents and the XYZ values for each of the primary luminances to obtain calculated currents. The method may further include storing the calculated currents indexed by the target luminances and the discrete temperatures.

In some embodiments, the method further includes interpolating or extrapolating the measurement points to provide modified measurement points as a function of the discrete temperatures and the drive currents. In some embodiments, the method further includes, for each of the discrete temperatures, sorting the modified measurement points by the luminance values. In some embodiments, the primary color light sources are LEDs. In some embodiments, the unit comprises a compound parabolic concentrator (CPC). In some embodiments, measuring the chromaticity and luminance values comprises receiving light transmitted through an eyepiece of the display device. In some embodiments, calculating the primary luminances and interpolating or extrapolating the drive currents and the XYZ values are performed over multiple iterations. In some embodiments, the calculated currents are stored in a lookup table.

In accordance with a second aspect of the present invention, a system for calibrating a display device including a set of primary color light sources disposed in a unit is provided. The system may include one or more processors. The system may also include a computer-readable medium comprising instructions that, when executed by the one or more processors, cause the one or more processors to perform operations. The operations may include obtaining, for each of the primary color light sources, measurement points including chromaticity and luminance values as a function of temperature of the unit and drive currents of the primary color light sources. The operations may also include converting the measurement points to an XYZ color space to produce XYZ values. The operations may further include, for each of a set of target luminances and a set of discrete temperatures, calculating primary luminances for each of the primary color light sources and interpolating or extrapolating the drive currents and the XYZ values for each of the primary luminances to obtain calculated currents. The operations may further include storing the calculated currents indexed by the target luminances and the discrete temperatures.

In some embodiments, the operations further include interpolating or extrapolating the measurement points to provide modified measurement points as a function of the discrete temperatures and the drive currents. In some embodiments, the operations further include, for each of the discrete temperatures, sorting the modified measurement points by the luminance values. In some embodiments, the primary color light sources are LEDs. In some embodiments, the unit comprises a CPC. In some embodiments, measuring the chromaticity and luminance values comprises receiving light transmitted through an eyepiece of the display device. In some embodiments, calculating the primary luminances and interpolating or extrapolating the drive currents and the XYZ values are performed over multiple iterations. In some embodiments, the calculated currents are stored in a lookup table.

In accordance with a third aspect of the present invention, a non-transitory computer-readable medium is provided. The non-transitory computer-readable medium may include instructions that, when executed by one or more processors, cause the one or more processors to perform operations including: obtaining, for each of a set of primary color light sources disposed in a unit of a display device, measurement points including chromaticity and luminance values as a function of temperature of the unit and drive currents of the primary color light sources. The operations may also include converting the measurement points to an XYZ color space to produce XYZ values. The operations may further include, for each of a set of target luminances and a set of discrete temperatures, calculating primary luminances for each of the primary color light sources and interpolating or extrapolating the drive currents and the XYZ values for each of the primary luminances to obtain calculated currents. The operations may further include storing the calculated currents indexed by the target luminances and the discrete temperatures.

In some embodiments, the operations further include interpolating or extrapolating the measurement points to provide modified measurement points as a function of the discrete temperatures and the drive currents. In some embodiments, the operations further include, for each of the discrete temperatures, sorting the modified measurement points by the luminance values. In some embodiments, the primary color light sources are LEDs.

Numerous benefits are achieved by way of the present disclosure over conventional techniques. For example, embodiments described herein enable brightness and color matching of displays between depth planes, between eyes, and between units. Embodiments described herein allow color calibration while eliminating the need to improve the accuracy of the color sources themselves by instead characterizing the actual spectral characteristics of the color sources and adjusting the combination amounts of each color based on the characterization. Other benefits of the present disclosure will be readily apparent to those skilled in the art.

DETAILED DESCRIPTION OF SPECIFIC EMBODIMENTS

The brightness and color of an optical display being powered by light-emitting diodes (LEDs) are highly sensitive to the spectral characteristics of the LEDs themselves. For example, due to both fabrication variability and the inherent limitations of narrow-band LEDs, the spectral characteristics of an LED can deviate significantly from an ideal monochromatic light source. The problem is exacerbated for optical systems, such as an optical see-through head-mounted display (OST-HMD), which include various optical components through which the light is channeled before arriving at the eye of the user. Each component may apply a unique distortion to the light that is difficult to model and/or account for. For displays that generate a particular color point by combining varying amounts of primary colors (e.g., red, green, and blue), the accuracy of the color point can be improved by (1) improving the accuracy of the primary colors themselves or by (2) characterizing the actual spectral characteristics of the color sources and adjusting the combination amounts of each color based on the characterization. Embodiments of the present invention are directed to the latter approach.

Embodiments of the present invention improve the brightness and color of optical displays by first characterizing the temperature and current dependence of each source LED and second adjusting the way the display receives and handles the emitted light from the source LEDs based on the characterization. These two steps may collectively be referred to as a "thermal calibration" or a "color calibration" of the optical display. The characterization step may occur during or after fabrication, e.g., while the device is still in the factory, by positioning a light detection device (e.g., a spectrometer) at a distance from the eyepiece where the user's eye would receive the light when the device is in use. The light detection device sequentially detects each source LED's output through the optical device as a controller (e.g., feed forward controller) iterates through a plurality of temperatures and currents. The outputs are analyzed to extract chromaticity and luminance data which are used to characterize each source LED. When the device is in actual use by the user, the calibration step is performed by measuring a temperature and adjusting the LED current and the color computation algorithm based on the characterization data as informed by the measured temperature.

Figure 1:
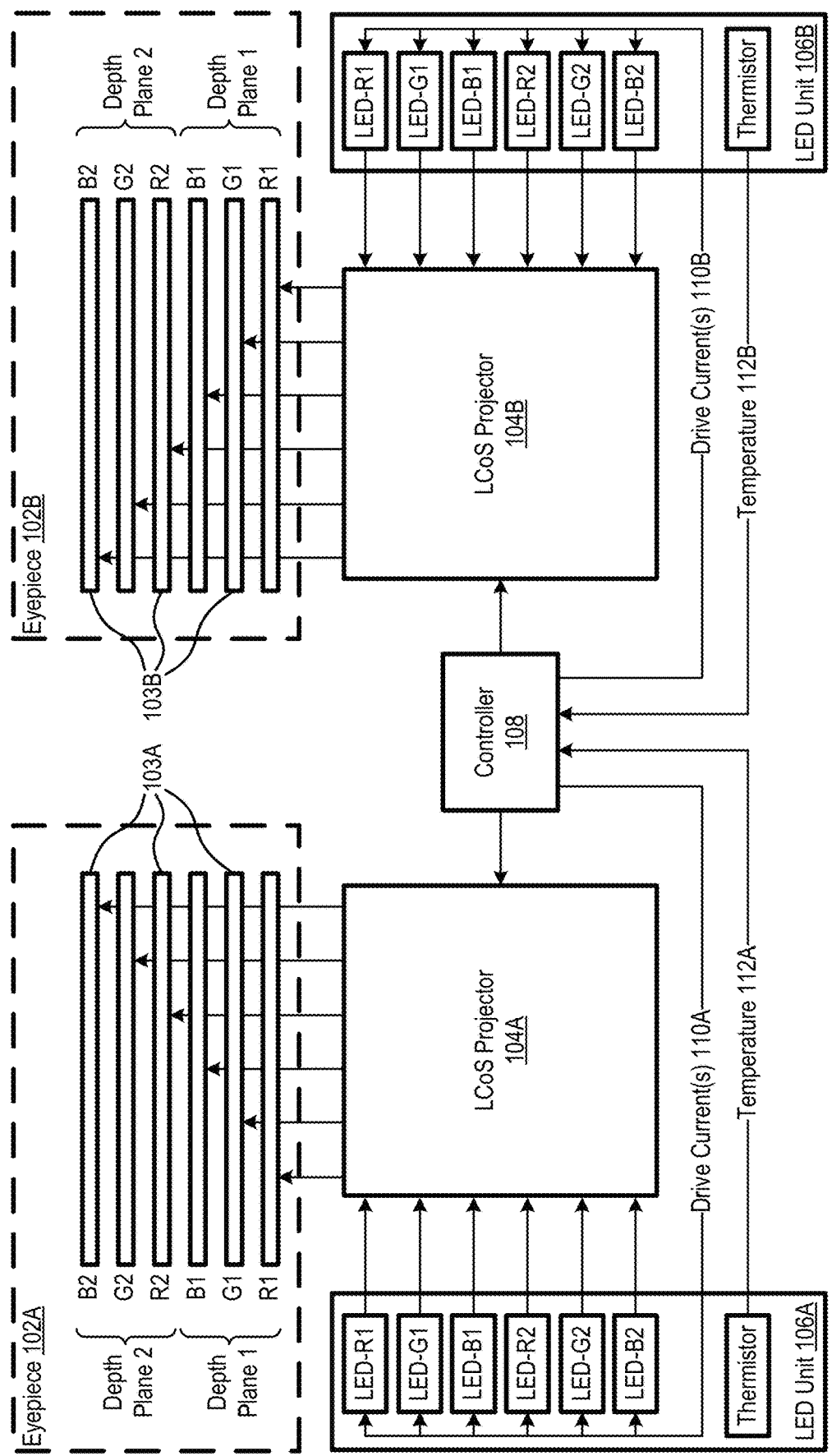
FIG. 1 illustrates a schematic view of a display device according to an embodiment of the present invention.

FIG. 1 illustrates a schematic view of a display device 100 according to an embodiment of the present invention. Display device 100 may be any number of optical systems or display devices, such as head-mounted displays including augmented reality (AR) devices, virtual reality (VR) devices, and the like. Display device 100 may include a left eyepiece 102A and a right eyepiece 102B each containing multiple waveguides 103 arranged in a side-by-side configuration forming an optical stack. Each of waveguides 103 receives light from a particular source LED that is spatially modulated by a liquid crystal on silicon (LCoS) projector 104. For example, referring to the right eyepiece 102B, the waveguide corresponding to red and depth plane 1 (i.e., waveguide R1) may receive light from the LED within a LED unit 106B corresponding to red and depth plane 1 (i.e., LED-R1) after the light is spatially modulated by LCoS projector 104B. Similarly, as another example, the waveguide corresponding to blue and depth plane 2 (i.e., waveguide B2) may receive light from the LED within LED unit 106B corresponding to blue and depth plane 2 (i.e., LED-B2) after the light is spatially modulated by LCoS projector 104B. The disclosure is applicable to any number of optical systems or displays. Accordingly, LCoS projectors 104 may be configured so as to channel the separate light inputs to the separate waveguides of eyepieces 102 without combining or mixing the light signals. Although FIG. 1 is described in reference to LCoS projectors 104, other types of spatial light modulators may be used.

In some embodiments, display device 100 includes a controller 108 for sending display instructions to LCoS projectors 104 and supplying drive current(s) 110 to the source LEDs. The display instructions may indicate which source LEDs are to be modulated and the modulation settings. In some embodiments, LCoS projectors 104 may sequentially modulate the light from different source LEDs (i.e., one at a time in a manner consistent with a field sequential display) or in some embodiments the light from multiple source LEDs may be modulated simultaneously. Controller 108 may also supply drive current(s) 110 to one or more of the source LEDs in coordination with the display instructions. In some embodiments, the display instructions and drive current(s) 110 may be influenced by temperatures 112 measured using thermistors coupled to LED units 106. Temperatures 112 may correspond to a temperature of LED units 106 which may be used as an approximation of the temperatures of the source LEDs. Temperatures 112B may be measured at predetermined intervals or in response to satisfaction of one or more criteria. For example, controller 108 may retrieve temperatures 112 each time a new display instruction is sent to LCoS projectors 104 and/or each time a user requests a recalibration of display device 100. Although FIG. 1A is described in reference to thermistors, other types of temperature sensors may be used.

In some embodiments, each of LED units 106 may comprise a thermal conductor coupled to each of the LEDs contained in the particular unit such that heating occurring at one LED may influence the temperature of other LEDs that are part of the same LED unit. Each of LED units 106 may include six LEDs (as illustrated in FIG. 1A), or some embodiments, each of LED units 106 may include three LEDs corresponding to primary colors of a particular depth plane. In some embodiments, multiple temperature sensors may be coupled to LED units 106 so as to better approximate the actual temperature of a particular LED. In some embodiments, each of LED units 106 may comprise one or more optical concentrators to collimate and/or modify the light emitted by the LEDs, for example, a Compound Parabolic Concentrator (CPC).

Figure 2:
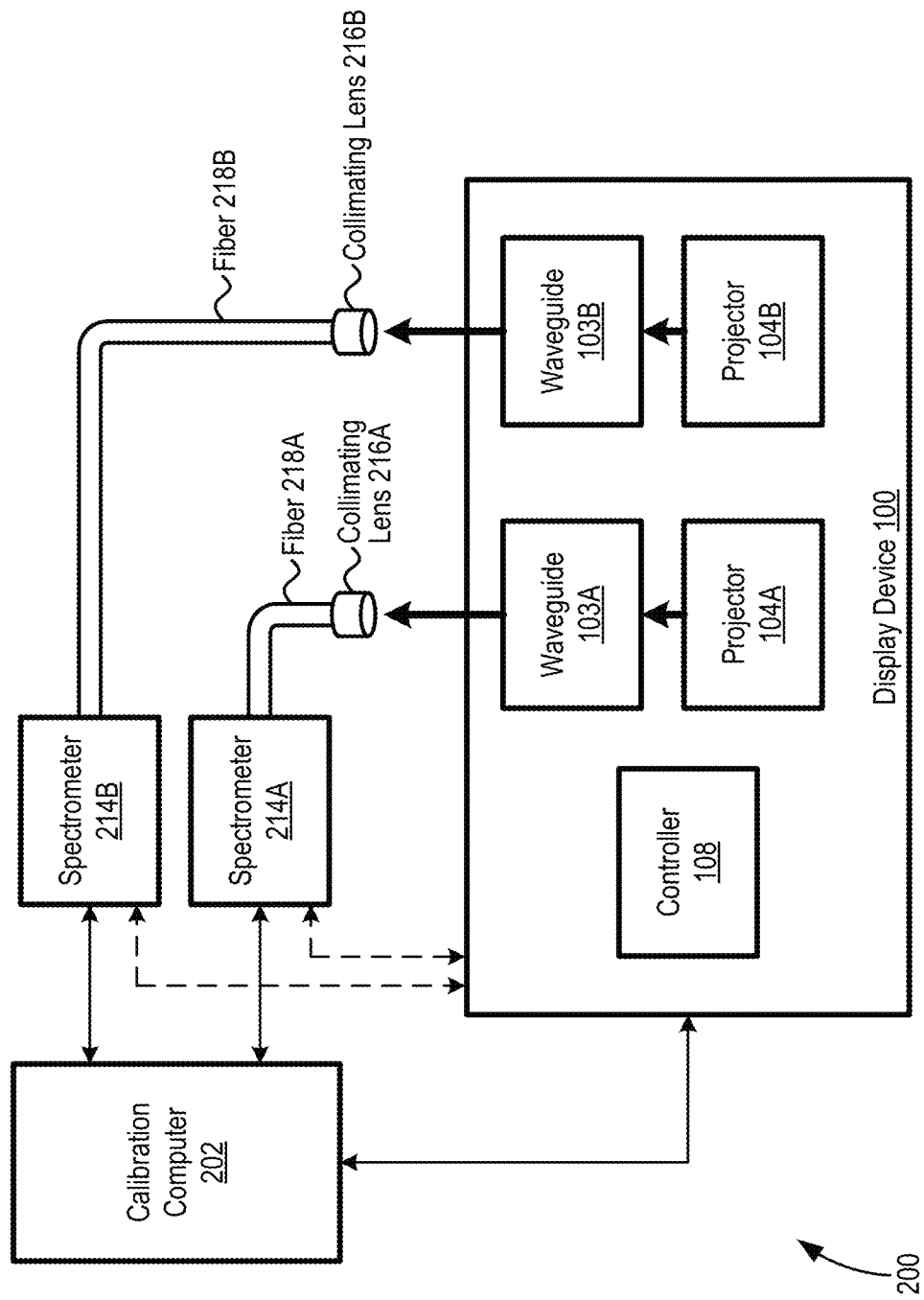
FIG. 2 illustrates a schematic diagram of a spectrometer calibration system for a display device according to an embodiment of the present invention.

FIG. 2 illustrates a schematic diagram of a spectrometer calibration system 200 for display device 100 according to an embodiment of the present invention. Referring to FIG. 2, display device 100 is positioned such that light emitted from waveguides 103 of eyepieces 102 are captured by collimating lenses 216 or other suitable optical coupling devices. As illustrated in FIG. 2, at least a portion of the light from each waveguide is captured and can be collimated for delivery to a characterization fiber 218. Characterization fibers 218 are optically coupled to spectrometers 214 that are utilized to characterize the spectral properties of the light emitted from the waveguides as described more fully herein. A calibration computer 202 may be utilized to control spectrometer calibration system 200.

During calibration, calibration computer 202 may instruct display device 100 to generate a virtual image that is displayed by display device 100. The term virtual image includes the display of a uniform screen of light associated with one of the primary colors, that is, a red screen, a green screen, or a blue screen. As an example, calibration computer 202 can control display device 100 to display light from a red LED. In this example, controller 108 may communicate with the red LED to generate an output. In some instances, the SLM drive electronics can be used to set the SLM in the projector to provide a constant reflection (e.g., maximum reflection) across the SLM in the projector. As a result, the light generated by the red LED will couple into and be emitted by waveguide 103, be collected by collimating lens 216, and be coupled into spectrometer 214 through fiber 218. Both the right and left red LEDs can be characterized either concurrently (e.g., simultaneously) or sequentially. One of ordinary skill in the art would recognize many variations, modifications, and alternatives.

In addition to using the LEDs in display device 100 to generate light that will enable spectral characterization of the LEDs, the LEDs can be utilized to generate heat in LED units 106, enabling characterization of the LEDS as a function of both drive current and CPC temperature. Additional description related to temperature control of LED units 106 is provided herein.

As described herein, embodiments of the present invention enable the spectral characterization of the LEDS in display device 100 in an assembled state of the wearable. Although the spectral characteristics of the LEDs in the LED package can provide insight into the LED characteristics in a discrete package, this characterization does not take into account optical impacts of incorporating the LEDs into the assembled wearable. For example, optical filters disposed along the optical path between the LEDs and the waveguide can absorb predetermined portions of the light emitted by the LEDS. As a result, the portions of the spectrum absorbed by the spectral filter will result in the spectral characteristics of the light emitted by the waveguides differing from the spectral characteristics of the light as emitted from the LED package. Moreover, the spectral throughput properties of the elements of the eyepiece, including the waveguide, can modify the spectral characteristics of the light after emission from the LED package. Accordingly, because the spectrometers receive light emitted by the assembled wearable, the spectral characterization of the LEDs includes the optical throughput properties of the various optical elements in the assembled wearable, not the spectral characteristics of the LED package before integration into the assembled wearable.

Figure 3:
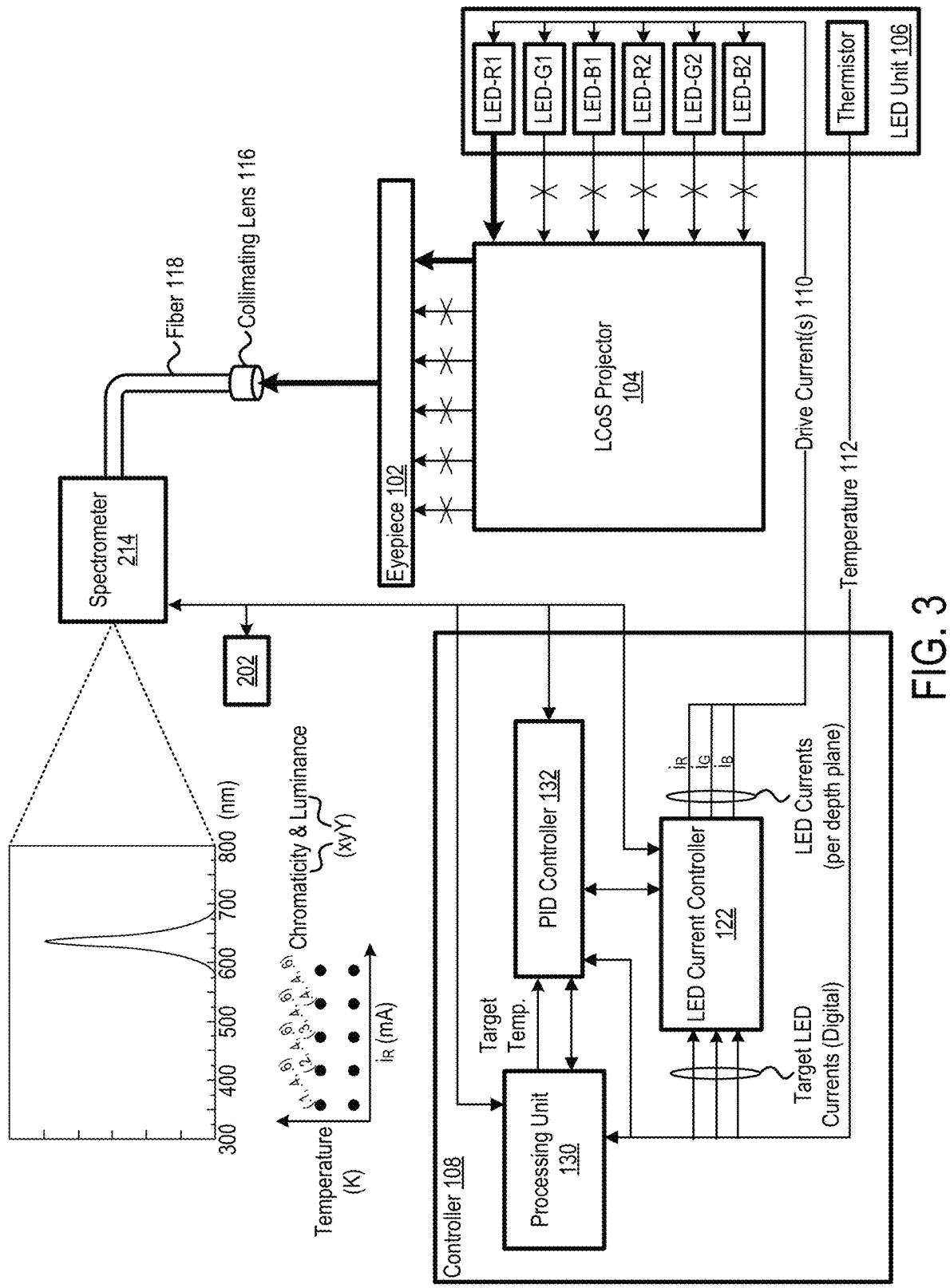
FIG. 3 illustrates an example characterization of a red LED.

FIG. 3 illustrates an example characterization of LED-R1. In some embodiments, a light detection device (e.g., spectrometer 214) is positioned at a particular distance from eyepiece 102B at a position that is approximately where the user's eye (also referred to as a viewer's eye) would receive the light when the device is in use. Spectrometer 214 may receive light through a collimating lens 216 that receives the light emitted by Display device 100 and a fiber 218 that directs the received light to spectrometer 214. In some embodiments, spectrometer 214 may be configured to measure the chromaticity and the luminance of the received light (e.g., in the xyY color space). This may be accomplished either by measuring the xyY values directly or by first measuring the light output as a function of wavelength and second analyzing the spectral characteristics of the light output to determine the xyY values.

Embodiments of the present invention characterize the spectral content of the light sources, e.g., LEDS, after propagation through the full optical stack of the optic device, for example, a wearable AR device. Accordingly, all of the optical characteristics, spectral attenuations, efficiencies, and the like are considered in calibrating the light sources, e.g., LEDs.

During the characterization of LED-R1, proportional-integral-derivative (PID) controller 132 causes the current powering LED-R1, $i_R$ of drive current(s) 110B, to iterate through a plurality of discrete currents. The discrete current values may be sent one at a time from the PID controller 132 to an LED current controller 122. LED current controller 122 may gradually ramp up or down current $i_R$ toward the particular target current or may, in some embodiments, immediately set current $i_R$ to the target current. In addition to current control of current $i_R$, LED current controller 122 may also provide one or more additional currents to the other illustrated LEDs that, as described more fully below, can cause temperature 112 of LED unit 106 to vary across a range of temperatures. Temperature control of the LED Unit can thus be achieved by controlling the currents of the non-characterized LEDs. For example, LED current controller 122, working in conjunction with PID controller 132, may increase or decrease the current values for currents $i_G$ and $i_B$ so as to increase or decrease temperature 112 of LED unit 106. As an example, as temperature 112 is fed back into PID controller 132, a comparison can be made between the previous temperature and the current temperature to determine how much each of the currents $i_G$ and $i_B$ need to be increased or decreased.

In order to measure the xyY values of the light output of LED-R1 across a representative range of both current $i_R$ and temperature 112, PID controller 132 may cause temperature 112 to vary while maintaining current $i_R$ constant. Alternatively or additionally, PID controller 132 may cause current $i_R$ to iterate through a plurality of discrete currents while maintaining temperature 112 relatively constant. In some embodiments, PID controller 132 may cause current $i_G$ and temperature 112 to vary concurrently or simultaneously. For example, PID controller 132 may drive current $i_G$ and temperature 112 toward a desired current-temperature pair of a list of current-temperature pairs. PID controller 132 may determine a fastest or most power efficient trajectory to navigate through the list of current-temperature pairs. Other possibilities are contemplated.

During the characterization of LED-R1, synchronization between spectrometer 214 and processing unit 130 (which is thereby synchronized with PID controller 132 and LED current controller 122) is utilized such that the LCoS projector 104 reflects only light output from LED-R1 for eventual delivery through eyepiece 102. As described below, one or more of the LEDs (e.g., all the LEDs) can be driven at specific current levels to generate the desired LED Unit temperature 112. Once the desired temperature is achieved, the LED being characterized can be operated to illuminate LCoS projector 104 for a predetermined time period.

Referring to FIG. 3, the target current for the red LED ($i_R$) and the target temperature of LED unit 106 are defined. The drive currents applied to each of the LEDs in LED unit 106 can be predetermined drive currents (i.e., set drive currents). The target temperatures of LED unit 106 can also be predetermined. Accordingly, as described more fully below, the chromaticity and luminance associated with each of the LEDs can be measured at a range of drive currents and LED unit temperatures.

For a field sequential display, the light sources (e.g., three of the RGB LEDs illustrated in FIG. 3) are driven sequentially in synchronization with the LCoS projector 104. For example, at 120 Hz, the frame time is ~8.3 ms. Each LED associated with a depth plane of the eyepiece (e.g., LED-R1, LED-G1, and LED-B1) may be illuminated sequentially for ~2.7 ms.

Figure 4:
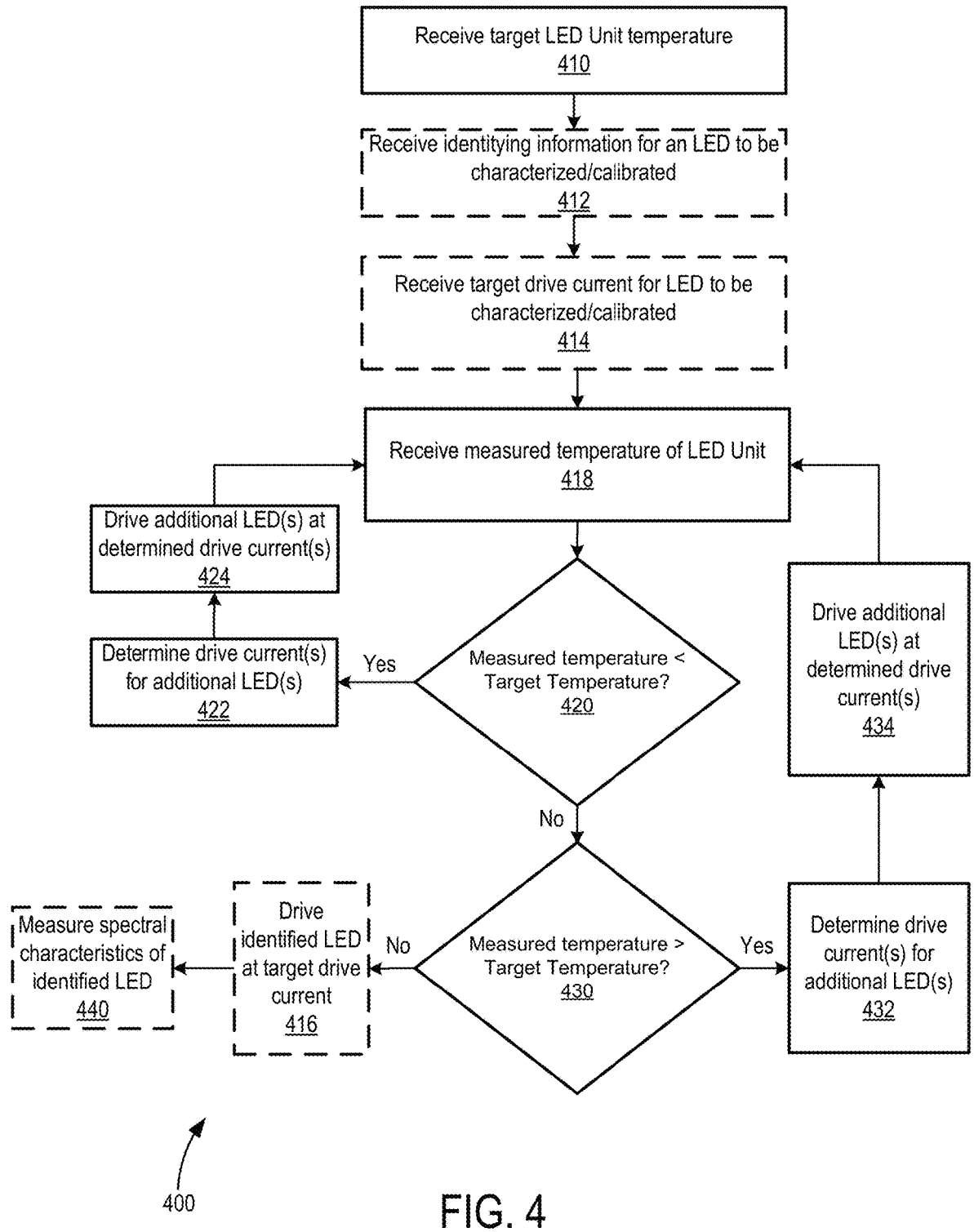
FIG. 4 is a simplified flowchart illustrating a method of setting LED currents using a PID controller according to an embodiment of the present invention.

FIG. 4 is a simplified flowchart illustrating a method 400 of setting LED currents using a HD controller according to an embodiment of the present invention. As illustrated in FIG. 4, a target temperature for the LED Unit is received by the HD controller (step 410). Identifying information related to an LED to be characterized and/or calibrated is also received by the PID controller (step 412). As an example, for an LED unit including two sets of LEDs (a first set of R1, G1, B1, and a second set of R2, G2, and B2), information can be received that the red LED of the first set, (i.e., LED-R1) is going to be characterized and/or calibrated. The LED identified for characterization/calibration can be referred to as the identified LED to differentiate this LED from the other LEDs in the LED unit. In addition to the identifying information, the target drive current for the LED to be characterized/calibrated is received (step 414).

In preparation for measurements related to the LED characterization/calibration, in some embodiments, the drive current for all of LEDs in one of the sets, or optionally, all of the LEDs in both sets, are controlled by the HD controller such that the PID controller adjusts the drive currents, which can include increasing the drive current(s) provided to one of more of the LEDs to a maximum value or reducing the drive currents(s) to zero, to achieve a LED unit temperature within a predetermined range (e.g., +/−0.5° C.) of the target temperature. As described herein, when the LED unit temperature is within the predetermined range of the target temperature, all LEDs other than the identified LED are turned off, the identified LED is driven at the target drive current, and the light output of the identified LED is measured using the spectrometer. During this spectral measurement, the LED unit temperature is measured, the average temperature during the spectral characterization is determined, and the average temperature is recorded, for example, in the same database, for example, the same entry, as the chromaticity and luminance.

The HD controller communicates with the LED current controller to set the drive current for the identified LED to the target drive current (step 416). In some embodiments, the temperature of the LED unit can be set at the target temperature independent of the characterization/calibration process. Accordingly, steps 412, 414, 416, and 440 are illustrated as optional in FIG. 4. The HD controller receives a temperature of the LED unit using the thermistor (step 418), which can be referred to as a measured temperature, and compares the target temperature to the measured temperature (step 420). If the measured temperature is less than the target temperature, then the heat generated by one or more of the other LEDs in the LED unit will be used to increase the temperature of the LED unit. Accordingly, if the measured temperate is less than the target temperature, then a drive current is determined for an additional LED (step 422). As an example, an initial, low drive current value can be determined for a second LED in the LED unit, for example, LED-G1. This initial drive current value is then provided to the LED current controller so that the additional LED (e.g., LED-G1) is driven at the initial drive current value (step 424). The temperature of the LED unit is measured (step 418) and if the measured temperature is still below the target temperature, then the initial drive current value for the second LED can be increased to a higher value (step 422). This process is repeated until the maximum drive current of the second LED has been reached.

The iterative process of comparing the measured temperature to the target temperature is repeated by determining drive currents for additional LEDs, for example, LED-B1, and the LEDs from the second set, until the target temperature is reached. In this process, each LED can initially be driven at a low current value that is increased over time to increase the amount of heat generated by the LED. By increasing the drive current in each additional LED and then adding each additional LED, the temperature of the LED unit can be increased in a substantially linear manner until the target temperature is reached.

As illustrated in FIG. 4, if the measured temperature is greater than the target temperature (step 430), then the drive currents in the additional LED(s) are decreased by the LED current controller (steps 432 and 434) to result in reduced heat generation and decreased LED Unit temperature as a consequence. Thus, if an initial calibration is performed at a first temperature and a second calibration is performed at a second temperature less than the first temperature, the system can decrease the temperature of the LED unit until the second temperature is reached. Accordingly, embodiments of the present invention enable measurement over a range of target temperatures for the LED unit.

Once the LED unit temperature is equal to the target temperature, the spectral characteristics of the identified LED can be measured (step 440). In some embodiments, all additional LEDs that were used to achieve the desired target temperature can be turned off. Since the thermal mass of the LED unit is non-zero, the LED unit will maintain the target temperature during the short time interval (several milliseconds) associated with the spectral characterization/calibration.

In some embodiments, the PID controller can include logic that will enable the iterative loop to converge more rapidly toward the target temperature. As an example, if the target temperature is significantly greater than the measured temperature, rather than starting with one additional LED at a low current value, two or more of the additional LEDs can be driven at a current value greater than the initial, low current values to more rapidly increase the temperature of the LED unit. One of ordinary skill in the art would recognize many variations, modifications, and alternatives.

Thus, the temperature of LED unit 106 can be controlled using PID controller 132 in conjunction with the operation of the various LEDs. As described above, in some embodiments, PID controller 132 drives the LEDs across their full current range to implement the desired range of LED unit temperatures.

It should be appreciated that the specific steps illustrated in FIG. 4 provide a particular method of setting LED currents using a PID controller according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

In order to control the temperature of LED unit 106, one or more of the LEDs in LED unit 106 are driven using drive current to generate heat in the LED unit, thereby increasing or decreasing the temperature of the LED unit in a controllable manner. As an example, during the measurement of the characteristics of red LED (LED-R1), one or more of the other red LED (LED-R2), the green LEDs (LED-G1 and LED-G2) and/or the blue LEDs (LED-B1 and LED-B2) can be operated at given currents to generate a desired amount of heating of LED unit 106. Once the desired temperature for the LED unit is achieved, or a temperature within a threshold of the desired temperature, the drive currents for each of the LEDs being operated, except for the LED being characterized, e.g., red LED (LED-R1), are set to zero and the LED being characterized is operated. Accordingly, only the red LED (LED-R1) will be illuminating LCoS projector 104 during measurement of the spectral properties of the red LED at the desired temperature. The illumination of LCoS projector 104 by the red LED can be maintained for the normal operating time (e.g., ~2.7 ms) to reproduce the normal operating characteristics.

Accordingly, in the embodiment illustrated in FIG. 3, each light source is characterized independently while using the other light sources to facilitate control of the optical package containing the light sources.

Although the various LEDs in LED unit 106 are utilized to enable temperature control in the embodiment illustrated in FIG. 3, this is not required by the present invention and other implementations can be utilized to provide temperature control including a thermoelectric cooler, or the like.

Referring to FIG. 3, target LED currents may be provided by processing unit 130 to LED current controller 122, which generates LED currents for each of the LEDs associated with each depth plane, for example, two sets of RGB currents ($i_R$, $i_G$, and $i_B$). As described herein, the currents can be generated concurrently and independently. Processing unit 130 may control the characterization process in use as well as the order of characterization steps. Processing unit 130 may provide the target temperature to HD controller 132. Synchronization between spectrometer 214, LED current controller 122, and processing unit 130 is utilized to collect the spectral data in conjunction with the driving of the LEDs by LED current controller 122.

As illustrated in FIG. 3, the temperature of the thermistor in LED unit 106 is provided to both HD controller 132 and processing unit 130. The temperature provided to PID controller 132 is utilized in the control algorithm used to control the temperature of LED unit 106B. The temperature provided to processing unit 130 is used to record the temperate in conjunction with the spectral measurements at a given LED current.

Returning to the description of the calibration of the first red LED (LED-R1), the drive current is applied to the LED being characterized (i.e., $i_R$) and the chromaticity and the luminance (xyY) produced by eyepiece 102 are measured using spectrometer 214. During the measurement by the spectrometer, the temperature of LED unit 106 is also measured, for example, using the thermistor. The measured spectral properties (e.g., xyY) and the measured temperature are recorded by processing unit 130 and/or calibration computer 202. Thus, as illustrated in FIG. 3, a database of chromaticity and luminance for each light source can be assembled as a function of LED unit temperature and drive current ($i_R$).

Figure 5:
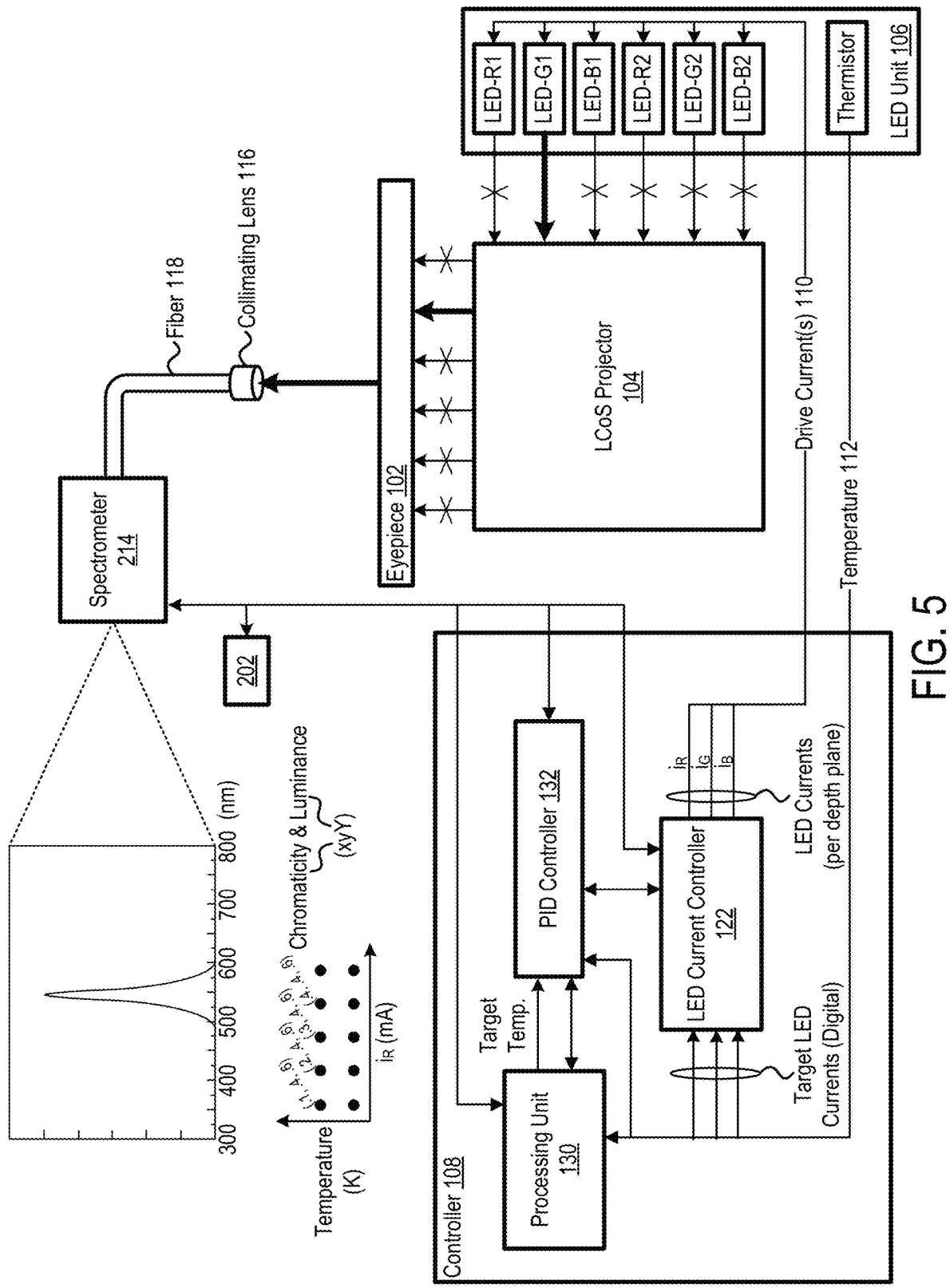
FIG. 5 illustrates an example characterization of a green LED.
Figure 6:
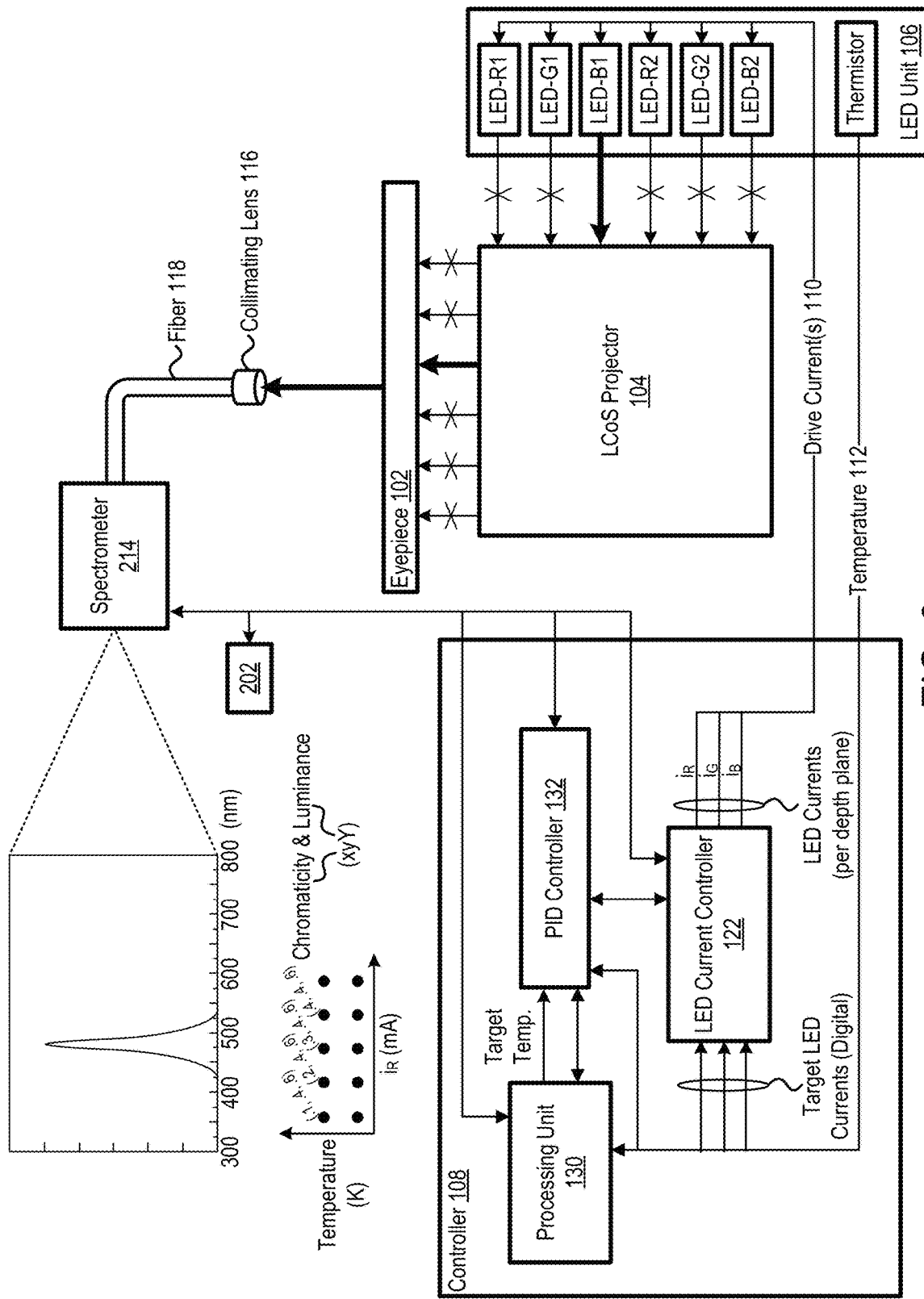
FIG. 6 illustrates an example characterization of a blue LED.

FIGS. 5 and 6 illustrate characterization of the other two LEDs associated with a depth plane. As discussed in relation to characterization of LED-R1, one or more of the various LEDs are operated in conjunction with PID controller 132 to control the temperature of LED unit 106 in advance of collection of spectral measurements for the LED being characterized. Similar procedures as those discussed in relation to the first depth plane can be utilized to characterize the three LEDs associated with the second depth plane. One of ordinary skill in the art would recognize many variations, modifications, and alternatives.

FIG. 5 illustrates an example characterization of LED-G1. Similar to the characterization of LED-R1, spectrometer 214 is positioned so as to measure the chromaticity and the luminance of the light output by LED-G1 modulated by LCoS projector 104. During the characterization of LED-G1, controller 108 causes the current powering LED-G1, $i_G$ of drive current(s) 110, to iterate through a plurality of discrete currents and for temperature 112 of LED unit 106 to vary across a range of temperatures. Temperature control of the LED Unit can be achieved by controlling the currents of the non-characterized LEDs. For example, LED current controller 122, working in conjunction with PID controller 132 may increase or decrease the current values for currents $i_R$ and $i_B$ so as to increase or decrease temperature 112 of LED unit 106. During the characterization of LED-G1, synchronization between spectrometer 214 and processing unit 130 (which is thereby synchronized with PID controller 132 and LED current controller 122) is utilized such that LCoS projector 104B reflects only light output from LED-G1 for eventual delivery through eyepiece 102. As described herein, one or more of the LEDs (e.g., all the LEDs) can be driven at specific current levels to generate the desired LED Unit temperature. Once the desired temperature is achieved, the LED being characterized can be operated to illuminate LCoS projector 104 for a predetermined time period.

FIG. 6 illustrates an example characterization of LED-B1. Similar to the characterizations of LED-R1 and LED-G1, spectrometer 214 is positioned so as to measure the chromaticity and the luminance of the light output by LED-B1 modulated by LCoS projector 104. During the characterization of LED-B1, controller 108 causes the current powering LED-B1, $i_B$ of drive current(s) 110, to iterate through a plurality of discrete currents and for temperature 112 of LED unit 106 to vary across a range of temperatures. Temperature control of the LED Unit can be achieved by controlling the currents of the non-characterized LEDs. For example, LED current controller 122, working in conjunction with PID controller 132 may increase or decrease the current values for currents $i_R$ and $i_G$ so as to increase or decrease temperature 112 of LED unit 106. During the characterization of LED-B1, synchronization between spectrometer 214 and processing unit 130 (which is thereby synchronized with PID controller 132 and LED current controller 122) is utilized such that LCoS projector 104 reflects only light output from LED-B1 for eventual delivery through eyepiece 102. As described herein, one or more of the LEDs (e.g., all the LEDs) can be driven at specific current levels to generate the desired LED Unit temperature. Once the desired temperature is achieved, the LED being characterized can be operated to illuminate the LCoS projector 104 for a predetermined time period.

Figure 7:
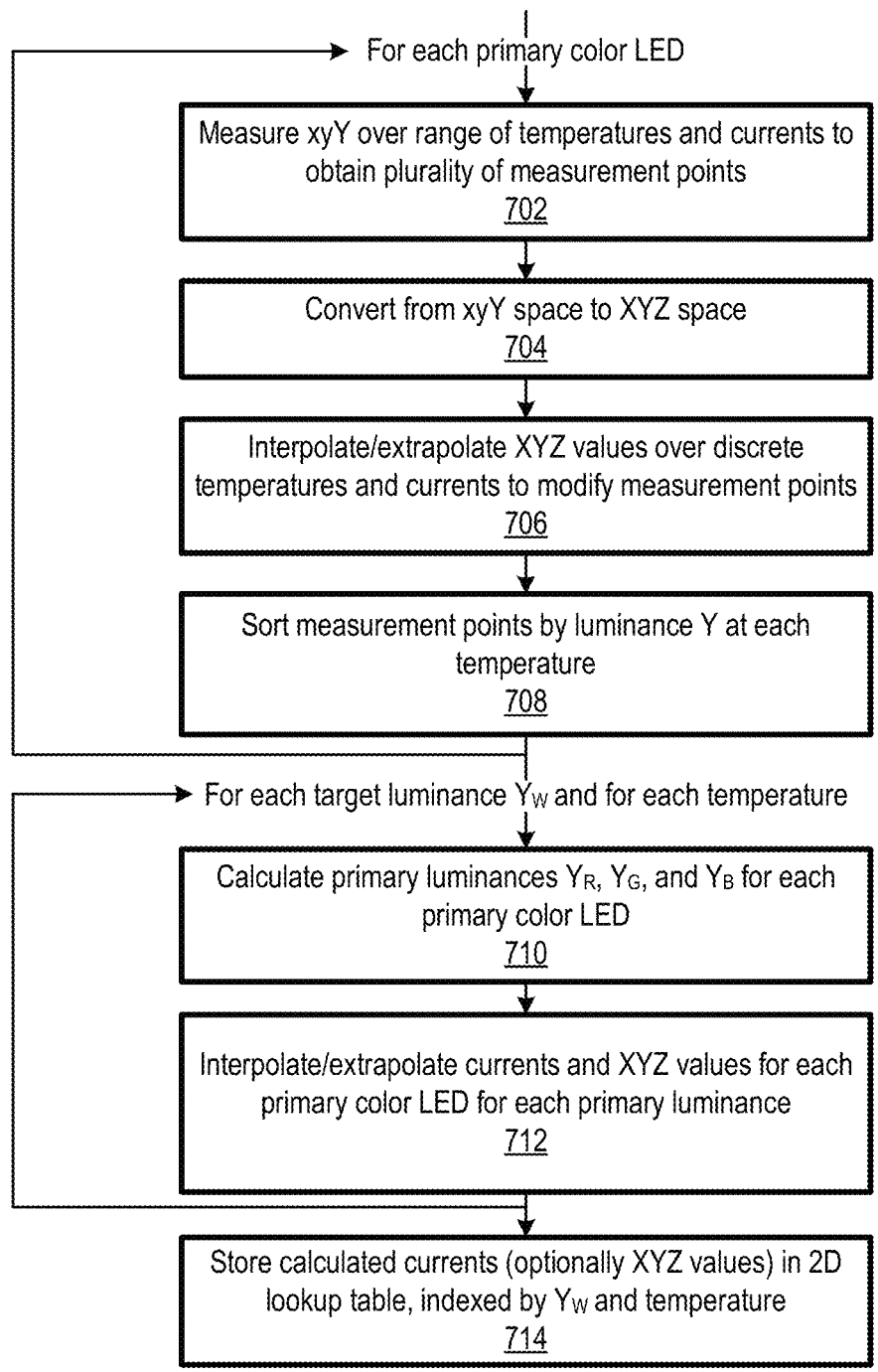
FIG. 7 illustrates a method for characterizing primary LEDs of an optical system such as a display device according to an embodiment of the present invention.

FIG. 7 illustrates a method 700 for characterizing primary LEDs of an optical system such as display device 100 according to an embodiment of the present invention. One or more steps of method 700 may be performed in a different order than that shown in FIG. 7, and not all steps need be performed. In some embodiments, steps 702 to 708 may be performed for each primary color LED. At step 702, xyY values are measured over a range of temperatures and currents to obtain a plurality of measurement points. Each measurement point of the plurality of measurement points includes a current, a temperature, and an xyY value.

At step 704, the plurality of measurement points are converted from xyY space to XYZ space. At step 706, the XYZ values are interpolated/extrapolated over discrete temperatures to modify the plurality of measurement points. At step 708, the plurality of measurement points are sorted by luminance at each temperature. In some embodiments, steps 710 and 712 may be performed for each target luminance $Y_W$ and for each temperature. At step 710, primary luminances $Y_R$, $Y_G$, and $Y_B$ are calculated using the chromaticity values for each primary color LED. As described more fully below in relation to FIG. 8B, for the initial calculation of the primary luminances, the chromaticity values for each of the LEDs measured at the median current can be used. In some embodiments, method 700 is performed with respect to a particular white point (e.g., D65).

At step 712, the XYZ values and the currents for each primary color are updated (e.g., modified) by interpolating/extrapolating for each primary color target luminance. In some embodiments, steps 710 and 712 are repeated until the XYZ values and/or the currents converge. The resulting currents may be referred to as calculated currents. In other embodiments, or in the same embodiments, steps 710 and 712 are repeated a predetermined number of times. Additional description related to the calibration process illustrated in FIG. 7 is provided in relation to FIGS. 8A-8C. At step 714, the currents (and optionally the XYZ values) calculated during the last iteration of step 712 are stored in a two-dimensional (2D) lookup table (LUT).

It should be appreciated that the specific steps illustrated in FIG. 7 provide a particular method of characterizing primary LEDs of an optical system according to another embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8A:
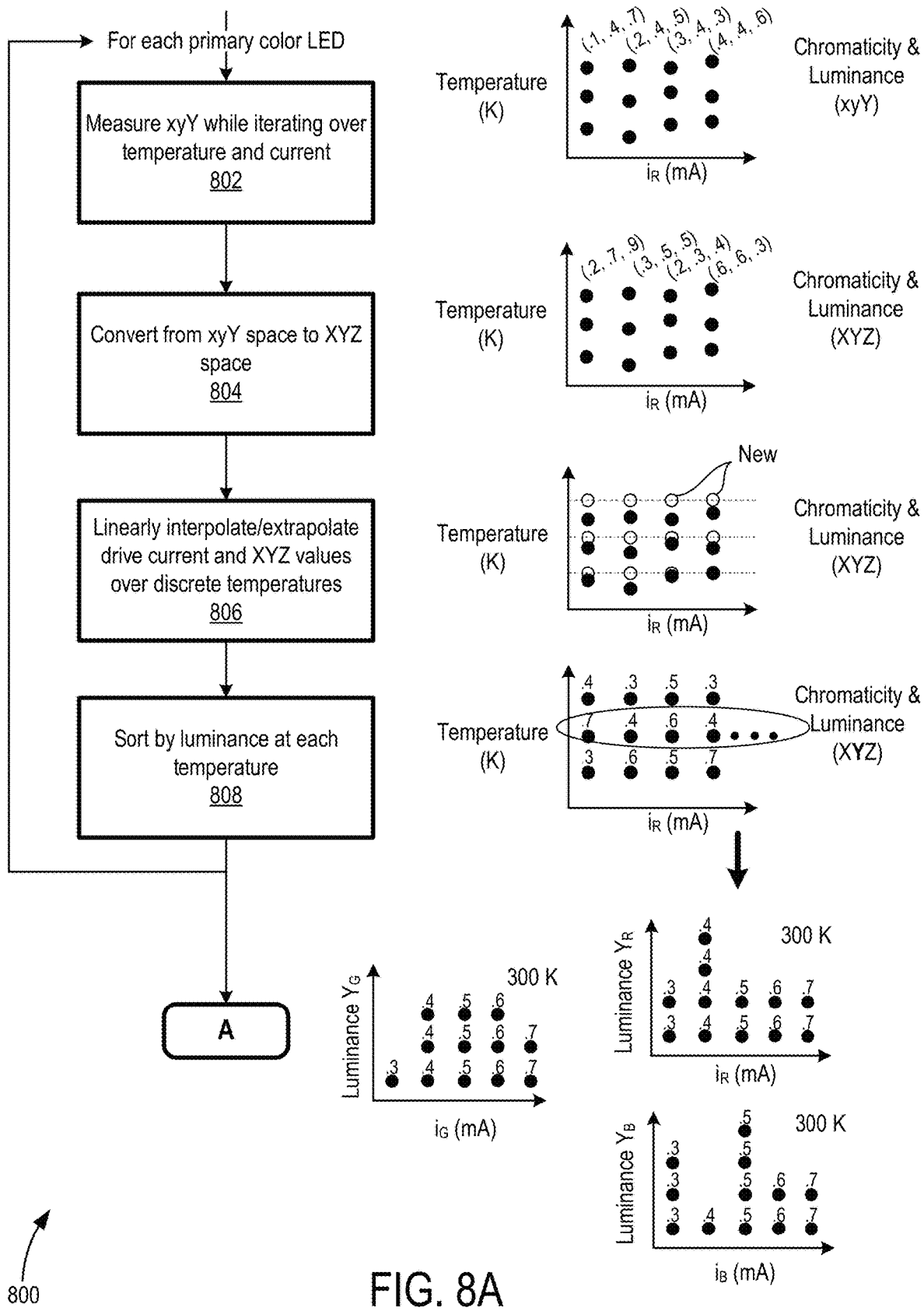
FIGS. 8A-8C illustrate a method of characterizing primary color LEDs of an optical system according to an embodiment of the present invention.
Figure 8B:
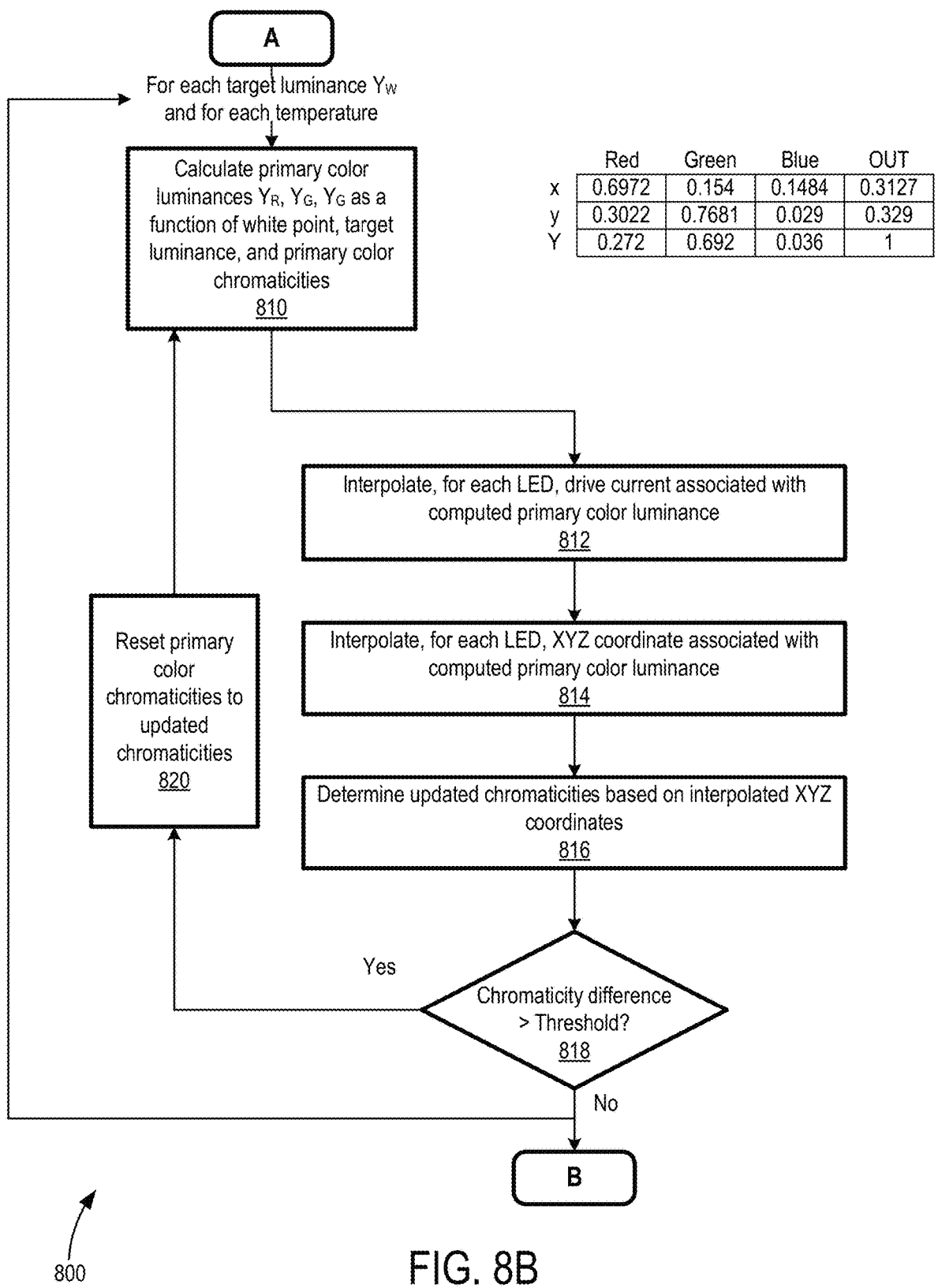
Figure 8C:
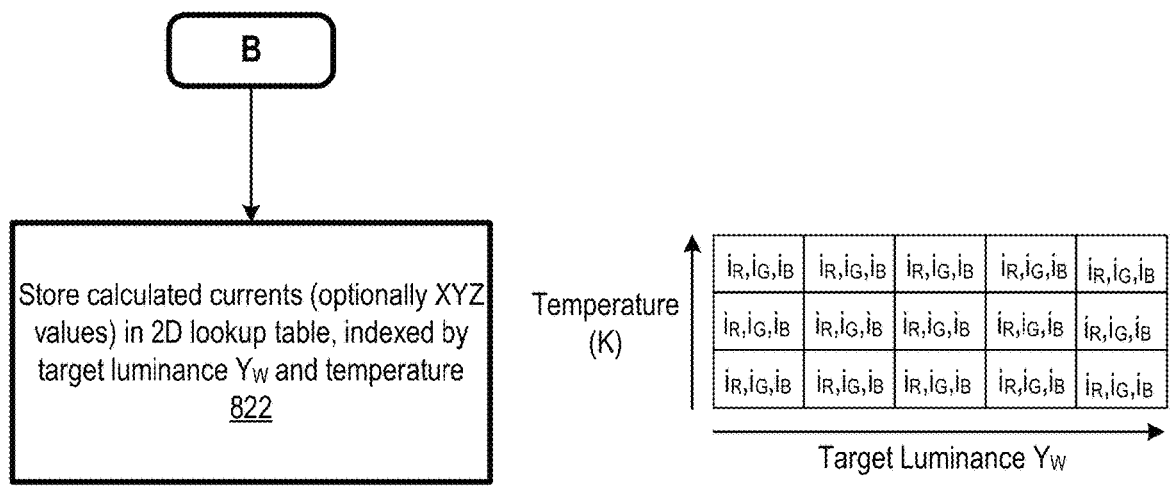

FIGS. 8A-8C illustrate a method 800 of characterizing primary color LEDs of an optical system according to an embodiment of the present invention. As discussed in relation to FIG. 3, the temperature of LED unit 106 may be controlled using HD controller 108 and the chromaticity and luminance (xyY) will be measured for each LED at a given drive current. These measurements will be repeated over a range of temperatures and drive currents (step 802). Although only measurements for the red LED are illustrated in FIG. 8A, it will be appreciated that similar databases can be assembled for each of the LEDs in the LED unit. The chromaticity and luminance measurements made in xyY space are converted to absolute color space in the form of XYZ color space (step 804).

During the measurement process, the measured LED unit temperature may vary from the target temperature as illustrated by the variation in temperature for measurements at various currents from a single temperature. Accordingly, interpolation/extrapolation is performed to determine interpolated drive current values and interpolated XYZ coordinates for discrete LED unit temperatures (step 806), with the temperature being used as the input in the interpolation calculation. Although linear interpolation is utilized in some embodiments, other interpolation techniques can be utilized in other embodiments. Thus, drive current values and XYZ values associated with discrete temperatures are provided as illustrated in FIG. 8A.

In order to assemble a database of drive current values and XYZ values associated with discrete target luminances, the chromaticity and luminance data entries are sorted by luminance at each discrete temperature (step 808). The collection of xyY data over a range of temperatures and drive currents, conversion to XYZ space, interpolation/extrapolation to align the current and XYZ data with discrete temperatures and sorting by luminance at each temperature are also performed for the other primary color LEDs.

Referring to FIG. 8B, given a target luminance, the desired white point (e.g., D65), and the chromaticities of the primary colors, the required primary color luminances are calculated (step 810). In other words, it is possible to solve for the red, green, and blue luminance ratios given a desired output chromaticity and the measured red, green, blue chromaticities in xyY space. Referring to FIG. 8B, for a given target luminance of 1, a desired white point of x=0.3127 and y=0.329 (i.e., D65), and chromaticities of x=0.6972 and y=0.3022 for red; x=0.154 and y=0.7681 for green; and x=0.1484 and y=0.029 for blue, required color luminances of Y=0.272 for red, Y=0.692 for green, and Y=0.036 for blue can be computed. The required color luminance for each primary color divided by the output luminance can be referred to as a luminance ratio (LR). In the example illustrated in FIG. 8B, since the output luminance is 1, the LRs are the required color luminances. If the output luminance was 100 nits, then, for this example, the required color luminance would be 27.2 nits for red, 69.2 nits for green, and 3.6 nits for blue.

As a starting point for the iteration, the chromaticity measured for each primary color at the median current can be utilized. Additionally, the measured chromaticities at the LED unit temperature can be utilized to provide more accurate initial primary color chromaticities. However, during actual operation, for example, as the temperature of the LED unit changes as a result of ambient temperature and/or as the temperature of the LED unit changes as a result of temperature variation of the LEDs in the LED unit (for example, as the drive current provided to the LEDs varies), the chromaticity of the red, green, and blue LEDs can vary from this median current chromaticity. In addition to the median current, other nominal values for LED chromaticity can be used.

Given the initially computed required primary color luminances for the three primary colors, these values will be used to index the ordered list sorted by luminance as illustrated in step 808 of FIG. 8A. Using the luminance values, the drive currents will be interpolated/extrapolated to obtain the drive currents associated with the computed luminance values. As illustrated in FIG. 8A, the array of luminance values as a function of drive current for each color at each temperature can be utilized to determine the drive current associated with each computed luminance value. In some implementations, a linear interpolation between drive currents is utilized to determine the interpolated drive current, which will typically vary from the median current used to provide the initial chromaticity.

As an example, if, at a temperature of 300° K, a drive current for the red LED of 100 mA produces a luminance of 20 nits and a drive current of 200 mA produces a luminance of 30 nits, then a linear interpolation can be used to determine that, in order to produce the computed red luminance of 27.2 nits, a drive current of 172 mA will produce the desired 27.2 nits of luminance.

Additionally, the XYZ color space values will be interpolated/extrapolated using the computed luminance values. Using a data set including the primary color luminance as a function of XYZ coordinates, in a manner similar to the LED drive current interpolation, the XYZ coordinates can be interpolated that will produce the desired luminance.

Given the interpolated chromaticity values (based on the interpolated XYZ values), an interactive loop will be utilized to compute updated primary color luminances based on the desired white point, the target luminance, and the interpolated chromaticity values.

In some embodiments, the difference between each of the primary color chromaticities is used for comparison with a threshold, whereas in other embodiments, the difference in the initial chromaticity and the updated chromaticity for the color being calibrated (e.g., red in this example) is utilized. In other embodiments, an average difference is computed and utilized. One of ordinary skill in the art would recognize many variations, modifications, and alternatives. Although a difference in initial and updated chromaticities is utilized in the embodiment illustrated in FIG. 8B, this is not required by the present invention and other methods, for example, iterating a predetermined number of times (e.g., 5, 10, 50, 100, 500, 1000, or 5000 iterations) can be utilized.

As illustrated in FIG. 8B, the method of forming a luminance axis of a two-dimensional LUT includes, at step 810, calculating required primary color luminances using a desired white point, a target luminance, and initial chromaticities of the primary colors. The initial chromaticities can be set as the chromaticities measured at a median drive current level.

The method also includes, for each primary color's computed luminance, at step 812, interpolating the drive current that is associated with each primary color luminance and, at step 814, interpolating the XYZ coordinate that is associated with each primary color luminance. The method further includes, at step 816, determining updated chromaticities based on the interpolated XYZ coordinates. If it is determined that the difference in one or more or an average of the interpolated chromaticities and the primary color chromaticities is greater than a threshold at step 818, then the method iterates, at step 820, using the new interpolated chromaticities for the primary color chromaticities. The iteration process can also be based on a predetermined number of iterations. Accordingly, after the iterative interpolation process, for each LED, drive currents and XYZ coordinates are aligned with discrete luminance values. The 2D LUT illustrated in FIG. 8C is thus generated based on the interpolated drive currents and XYZ coordinates for discrete LED unit temperatures and discrete luminance values and can be stored for use by the feed forward control system described herein.

Referring back to FIG. 8A, the luminance at each temperature was sorted to provide the sorted luminance values, as shown at step 808. The process illustrated in FIG. 8B will be repeated at each discrete temperature, producing the 2D LUT defining drive currents as a function of LED unit temperature and target luminance as shown in FIG. 8C. Thus, if there are M target luminances and N discrete temperatures, the iterative process illustrated in FIG. 8B will be performed M×N times.

Although only drive currents are illustrated in FIG. 8C, the 2D LUT can also store chromaticity and luminance information such as the XYZ coordinates as a function of temperature and luminance in addition to the drive currents (step 822). For example, the XYZ coordinates can be used to reduce the color gamut to a standard format. Thus, in FIG. 8C, the entries in the 2D LUT can be expanded from $\{i_R, i_G, i_B\}$ to $\{i_R, i_G, i_B, X_R, X_G, X_B, Y_R, Y_G, Y_B, Z_R, Z_G, Z_B\}$. Thus, in addition to indexed drive currents for use in the feed forward control system, other indexed values can be stored in the 2D LUT for use by various system elements.

Although embodiments are described in terms of achieving D65 as a white point, the present invention is not limited to this white point. In order to provide alternative white points, embodiments of the present invention can be utilized to provide alternative 2D LUTs that are associated with alternative white points. As illustrated in FIG. 8B, the target chominance values are inputs (given variables) to the computation of the primary color luminance values and modification of these inputs will result in 2D LUTs with modified entries appropriate to the alternative white points. In other embodiments, the implementation to provide alternative white points can be implemented at the level of controller 108.

It should be appreciated that the specific steps illustrated in FIG. 8B provide a particular method of determining drive currents and XYZ coordinates for each target luminance and each target temperature according to another embodiment of the present invention. Other sequences of steps may also be performed according to alternative embodiments. For example, alternative embodiments of the present invention may perform the steps outlined above in a different order. Moreover, the individual steps illustrated in FIG. 8B may include multiple sub-steps that may be performed in various sequences as appropriate to the individual step. Furthermore, additional steps may be added or removed depending on the particular applications. One of ordinary skill in the art would recognize many variations, modifications, and alternatives.

In relation to the calculation of the primary color luminance ratios, to solve for the luminance ratios, equations that calculate the output chromaticity based on the contributing chromaticities and luminance are used. Luminances can be added in xyY or XYZ space to get the output luminance. However, as xyY is a non-linear space, chromaticities are only added when expressed in XYZ space.

To convert from xyY space to XYZ space, the following equations are used:

$$X = \frac{Y}{y} x \quad Y = Y \quad Z = \frac{Y}{y}(1 - x - y)$$

Conversion from XYZ space to xyY space is performed as:

$$x = \frac{X}{X+Y+Z} \quad y = \frac{Y}{X+Y+Z} \quad Y = Y$$

In order to calculate the primary color luminance ratios, the XYZ summation equations can be rewritten with xyY primary coordinates substituted as:

$$\left(\frac{x_R}{y_R}\right)Y_R + \left(\frac{x_G}{y_G}\right)Y_G + \left(\frac{x_B}{y_B}\right)Y_B = \left(\frac{x_{OUT}}{y_{OUT}}\right)Y_{OUT}$$

$$Y_R + Y_G + Y_B = Y_{OUT}$$

$$\left(\frac{1-x_R-y_R}{y_R}\right)Y_R + \left(\frac{1-x_G-y_G}{y_G}\right)Y_G + \left(\frac{1-x_B-y_B}{y_B}\right)Y_B = \left(\frac{1-x_{OUT}-y_{OUT}}{y_{OUT}}\right)Y_{OUT}$$

This equation can be rewritten in matrix form as:

$$\begin{bmatrix} \left(\frac{x_{OUT}}{y_{OUT}}\right)Y_{OUT} \\ Y_{OUT} \\ \left(\frac{1-x_{OUT}-y_{OUT}}{y_{OUT}}\right)Y_{OUT} \end{bmatrix} =$$

-continued $$\begin{bmatrix} \left(\frac{x_R}{y_R}\right) & \left(\frac{x_G}{y_G}\right) & \left(\frac{x_B}{y_B}\right) \\ 1 & 1 & 1 \\ \left(\frac{1-x_R-y_R}{y_R}\right) & \left(\frac{1-x_G-y_G}{y_G}\right) & \left(\frac{1-x_B-y_B}{y_B}\right) \end{bmatrix} \begin{bmatrix} Y_R \\ Y_G \\ Y_B \end{bmatrix}$$

Rearranging to solve for $Y_{RGB}$ yields:

$$\begin{bmatrix} Y_R \\ Y_G \\ Y_B \end{bmatrix} = \begin{bmatrix} \left(\frac{x_R}{y_R}\right) & \left(\frac{x_G}{y_G}\right) & \left(\frac{x_B}{y_B}\right) \\ 1 & 1 & 1 \\ \left(\frac{1-x_R-y_R}{y_R}\right) & \left(\frac{1-x_G-y_G}{y_G}\right) & \left(\frac{1-x_B-y_B}{y_B}\right) \end{bmatrix}^{-1} \begin{bmatrix} \left(\frac{x_{OUT}}{y_{OUT}}\right)Y_{OUT} \\ Y_{OUT} \\ \left(\frac{1-x_{OUT}-y_{OUT}}{y_{OUT}}\right)Y_{OUT} \end{bmatrix}$$

To compute the luminance ratios, both sides can be divided by $Y_{OUT}$ to yield:

$$\begin{bmatrix} LR_R \\ LR_G \\ LR_B \end{bmatrix} = \begin{bmatrix} \frac{Y_R}{Y_{OUT}} \\ \frac{Y_G}{Y_{OUT}} \\ \frac{Y_B}{Y_{OUT}} \end{bmatrix} = \begin{bmatrix} \left(\frac{x_R}{y_R}\right) & \left(\frac{x_G}{y_G}\right) & \left(\frac{x_B}{y_B}\right) \\ 1 & 1 & 1 \\ \left(\frac{1-x_R-y_R}{y_R}\right) & \left(\frac{1-x_G-y_G}{y_G}\right) & \left(\frac{1-x_B-y_B}{y_B}\right) \end{bmatrix}^{-1} \begin{bmatrix} \left(\frac{x_{OUT}}{y_{OUT}}\right) \\ 1 \\ \left(\frac{1-x_{OUT}-y_{OUT}}{y_{OUT}}\right) \end{bmatrix}$$

In a similar fashion, the luminance ratios can be determined for primaries and the desired output given in XYZ space. To solve for the luminances (i.e., luminance ratios) in the above example, the chromiticities may be converted to XYZ space because xyY is a non-linear space and XYZ is a linear space. In some embodiments, conversion from xyY space to XYZ space may be performed using the following equations: $X=Y/y*x$, $Y=Y$, and $Z=Y/y*(1-x-y)$. Conversely, conversion from XYZ space to xyY space may be performed using the following equations: $x=X/(X+Y+Z)$, $y=Y/(X+Y+Z)$, and $Y=Y$. After converting to XYZ space, the luminance ratios can be calculated using the following equation:

$$\begin{bmatrix} LR_R \\ LR_G \\ LR_B \end{bmatrix} = \begin{bmatrix} \frac{Y_R}{Y_{OUT}} \\ \frac{Y_G}{Y_{OUT}} \\ \frac{Y_B}{Y_{OUT}} \end{bmatrix} = \begin{bmatrix} \left(\frac{X_R}{Y_R}\right) & \left(\frac{X_G}{Y_G}\right) & \left(\frac{X_B}{Y_B}\right) \\ 1 & 1 & 1 \\ \left(\frac{X_R}{Y_R}\right) & \left(\frac{X_G}{Y_G}\right) & \left(\frac{X_B}{Y_B}\right) \end{bmatrix}^{-1} \begin{bmatrix} \frac{X_{OUT}}{Y_{OUT}} \\ 1 \\ \frac{Z_{OUT}}{Y_{OUT}} \end{bmatrix}$$

In the previous calibration, it is found the luminance of each LED ($Y_{sRGB\_*\_TO\_W}$) to hit the target sRGB white point (0.3127, 0.3290) at a given brightness. The native LED gamut is reduced to the sRGB gamut, while maintaining the same white point.

The same function used before may be used to calculate the LEDs' luminance ratios needed for the desired white point to calculate the LEDs' luminance ratios for each sRGB primary.

For sRGB red:

$$\{LR_{R\_TO\_R\_NATIVE}, LR_{G\_TO\_R\_NATIVE}, LR_{B\_TO\_R\_NATIVE}\} \text{ GET\_LR(out\_xy=0.6400, 0.3300, native\_xy\_rgb)}$$

For sRGB green:

$$\{LR_{R\_TO\_G\_NATIVE}, LR_{G\_TO\_G\_NATIVE}, LR_{B\_TO\_G\_NATIVE}\}=\text{GET\_LR(out\_xy=0.3000, 0.6000, native\_xy\_rgb)}$$

For sRGB blue:

$$\{LR_{R\_TO\_B\_NATIVE}, LR_{G\_TO\_B\_NATIVE}, LR_{B\_TO\_B\_NATIVE}\}=\text{GET\_LR(out\_xy=0.1500, 0.0600, native\_xy\_rgb)}$$

Since the chromaticity of the primary colors are changed, the luminance rations for sRGB White can be computed as:

$$\{LR_{R\_TO\_W}, LR_{G\_TO\_W}, LR_{B\_TO\_W}\}=\text{GET\_LR} \text{(out\_xy}=\{0.3127, 0.3290\}, \text{sRGB\_xy}=\{0.6400, 0.3300\}, \{0.3000, 0.6000\}, \{0.1500, 0.0600\})$$

The conversion of a pixel's value in RGB space to LEDs' luminance value can be expressed as:

$$\begin{bmatrix} Y_{R\_OUT} \\ Y_{G\_OUT} \\ Y_{B\_OUT} \end{bmatrix} = \begin{bmatrix} Y_{R\_NATIVE} & 0 & 0 \\ 0 & Y_{G\_NATIVE} & 0 \\ 0 & 0 & Y_{B\_NATIVE} \end{bmatrix} \begin{bmatrix} k_{00} & k_{01} & k_{02} \\ k_{10} & k_{11} & k_{12} \\ k_{20} & k_{21} & k_{22} \end{bmatrix} \begin{bmatrix} R_{in} \\ G_{in} \\ B_{in} \end{bmatrix}$$

where the 3×3 of constants $k_{ij}$ is the color space conversion (CSC) matrix that we will use to reduce the gamut.

The CSC matrix can be solved such that the following conditions are met:

When $RGB_{IN}=[1 \ 0 \ 0]^T$, $$Y_{OUT}=[Y_{W\_NATIVE}*LR_{R\_TO\_W}*LR_{R\_TO\_R\_NATIVE}, Y_{W\_NATIVE}*LR_{R\_TO\_W}*LR_{G\_TO\_R\_NATIVE}, Y_{W\_NATIVE}*LR_{R\_TO\_W}*LR_{B\_TO\_R\_NATIVE}]^T$$

When $RGB_{IN}=[0 \ 1 \ 0]^T$, $$Y_{OUT}=[Y_{W\_NATIVE}*LR_{G\_TO\_W}*LR_{R\_TO\_G\_NATIVE}, Y_{W\_NATIVE}*LR_{G\_TO\_W}*LR_{G\_TO\_G\_NATIVE}, Y_{W\_NATIVE}*LR_{G\_TO\_W}*LR_{B\_TO\_G\_NATIVE}]^T$$

When $RGB_{IN}=[0 \ 0 \ 1]^T$, $$Y_{OUT}=[Y_{W\_NATIVE}*LR_{B\_TO\_W}*LR_{R\_TO\_B\_NATIVE}, Y_{W\_NATIVE}*LR_{B\_TO\_W}*LR_{G\_TO\_B\_NATIVE}, Y_{W\_NATIVE}*LR_{B\_TO\_W}*LR_{B\_TO\_B\_NATIVE}]^T$$

By this construction, it is guaranteed that the following condition is also met:

When $RGB_{IN}=[1 \ 1 \ 1]^T$, $$Y_{OUT}=[Y_{R\_NATIVE}, Y_{G\_NATIVE}, Y_{B\_NATIVE}]^T.$$

Substituting $RGB_{IN}=[1 \ 0 \ 0]^T$ and $Y_{OUT}=$
$[Y_{W\_NATIVE}*LR_{R\_TO\_W}*LR_{R\_TO\_R\_NATIVE}, Y_{W\_NATIVE}*LR_{R\_TO\_W}*LR_{G\_TO\_R\_NATIVE}, Y_{W\_NATIVE}*LR_{R\_TO\_W}*LR_{B\_TO\_R\_NATIVE}]^T$ $$\frac{Y_{W\_NATIVE} \times LR_{R\_TO\_W} \times LR_{R\_TO\_R\_NATIVE}}{Y_{R\_NATIVE}} = k_{00}$$

$$\frac{Y_{W\_NATIVE} \times LR_{R\_TO\_W} \times LR_{G\_TO\_R\_NATIVE}}{Y_{G\_NATIVE}} = k_{10}$$

$$\frac{Y_{W\_NATIVE} \times LR_{R\_TO\_W} \times LR_{B\_TO\_R\_NATIVE}}{Y_{B\_NATIVE}} = k_{20}$$

Substituting $RGB_{IN}=[0 \ 1 \ 0]^T$, $Y_{OUT}=[Y_{W\_NATIVE}*LR_{G\_TO\_W}*LR_{R\_TO\_G\_NATIVE}, Y_{W\_NATIVE}*LR_{G\_TO\_W}*LR_{G\_TO\_G\_NATIVE}, Y_{W\_NATIVE}*LR_{G\_TO\_W}*LR_{B\_TO\_G\_NATIVE}]^T$ $$\frac{Y_{G\_NATIVE} \times LR_{R\_TO\_G\_NATIVE}}{Y_{R\_NATIVE}} = k_{01}$$

$$\frac{Y_{G\_NATIVE} \times LR_{G\_TO\_G\_NATIVE}}{Y_{G\_NATIVE}} = k_{11}$$

$$\frac{Y_{G\_NATIVE} \times LR_{B\_TO\_G\_NATIVE}}{Y_{B\_NATIVE}} = k_{21}$$

Substituting $RGB_{IN}=[0 \ 0 \ 1]^T$, $Y_{OUT}=[Y_{W\_NATIVE}*LR_{B\_TO\_W}*LR_{R\_TO\_B\_NATIVE}, Y_{W\_NATIVE}*LR_{B\_TO\_W}*LR_{G\_TO\_B\_NATIVE}, Y_{W\_NATIVE}*LR_{B\_TO\_W}*LR_{B\_TO\_B\_NATIVE}]^T$ $$\frac{Y_{B\_NATIVE} \times LR_{R\_TO\_B\_NATIVE}}{Y_{R\_NATIVE}} = k_{02}$$

$$\frac{Y_{B\_NATIVE} \times LR_{G\_TO\_B\_NATIVE}}{Y_{G\_NATIVE}} = k_{12}$$

$$\frac{Y_{B\_NATIVE} \times LR_{B\_TO\_B\_NATIVE}}{Y_{B\_NATIVE}} = k_{22}.$$

Figure 9:
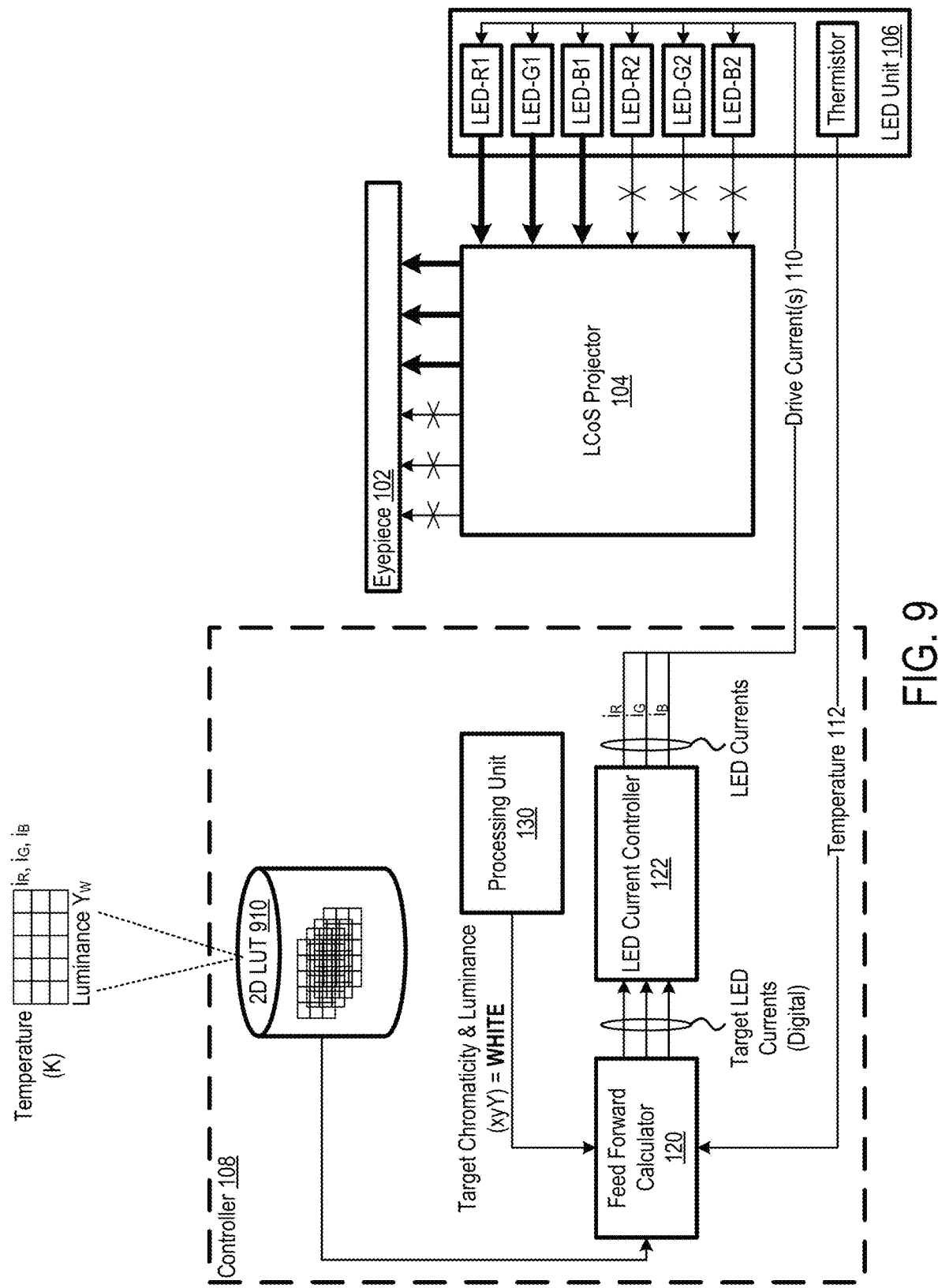
FIG. 9 illustrates a operation of a first set of primary LEDs of a display device that have been previously characterized to generate a 2D LUT.

FIG. 9 illustrates a operation of a first set of primary LEDs of display device 100 that have been previously characterized to generate 2D LUT 910. As illustrated in FIG. 8C, the 2D LUT provides the drive currents for each of the LEDs in the first set of primary LEDs. When display device 100 is in actual use by a user, the first set of primary LEDs are operated by a process that includes measuring temperature 112, receiving a target luminance, accessing 2D LUT 910 to determine currents $i_R$, $i_G$, and $i_B$, and driving the LEDs with the determined currents. A bilinear interpolation can be utilized in conjunction with the 2D LUT to determine drive currents as a function of temperature and target luminance for arbitrary temperatures and target luminances. As illustrated in FIG. 9, the operating temperature 112 of the LED unit 106 is measured using the thermistor and provided to feed forward calculator 120 and used in determining the drive current for the various LEDs.

Referring to FIG. 9, a target chromaticity (e.g., D65) and luminance (e.g., 100 nits) are received at the feed forward calculator 120 from processing unit 130. The temperature of LED unit 106 is received at feed forward calculator 120 from the thermistor. Using the 2D LUT that defines drive currents as a function of temperature and luminance, the target LED current signals (e.g., digital signals) are generated by feed forward calculator 120 and provided to LED current controller 122. Although only three currents are illustrated in FIG. 9, it will be appreciated that for a dual depth plane implementation with two eyepieces (right and left), 12 target LED current signals will be generated. LED current controller 122 then generates analog drive currents that are used to drive the corresponding LED. As illustrated in FIG. 9, three LEDs are driven (LED-R1, LED-G1, and LED-B1) to provide inputs to one depth plane of eyepiece 102 after reflection from LCoS projector 104. In order to generate a uniform white light display, the pixels of the LCoS projector 104 will be set to a uniform (i.e., maximum) reflectivity to reflect the light generated during the sequential operation of the primary color LEDs.

As the target luminance specified by processing unit 130 or the temperature of the LED unit 106 changes, feed forward calculator 120 will update the target LED currents based on these changes, thereby providing output from the eyepiece 102 that is characterized by a consistent white point at the target luminance. In some embodiments, feed forward calculator 120 updates the target LED currents at a predetermined periodic rate (e.g., every frame or a periodicity of ~83 ms).

Figure 10:
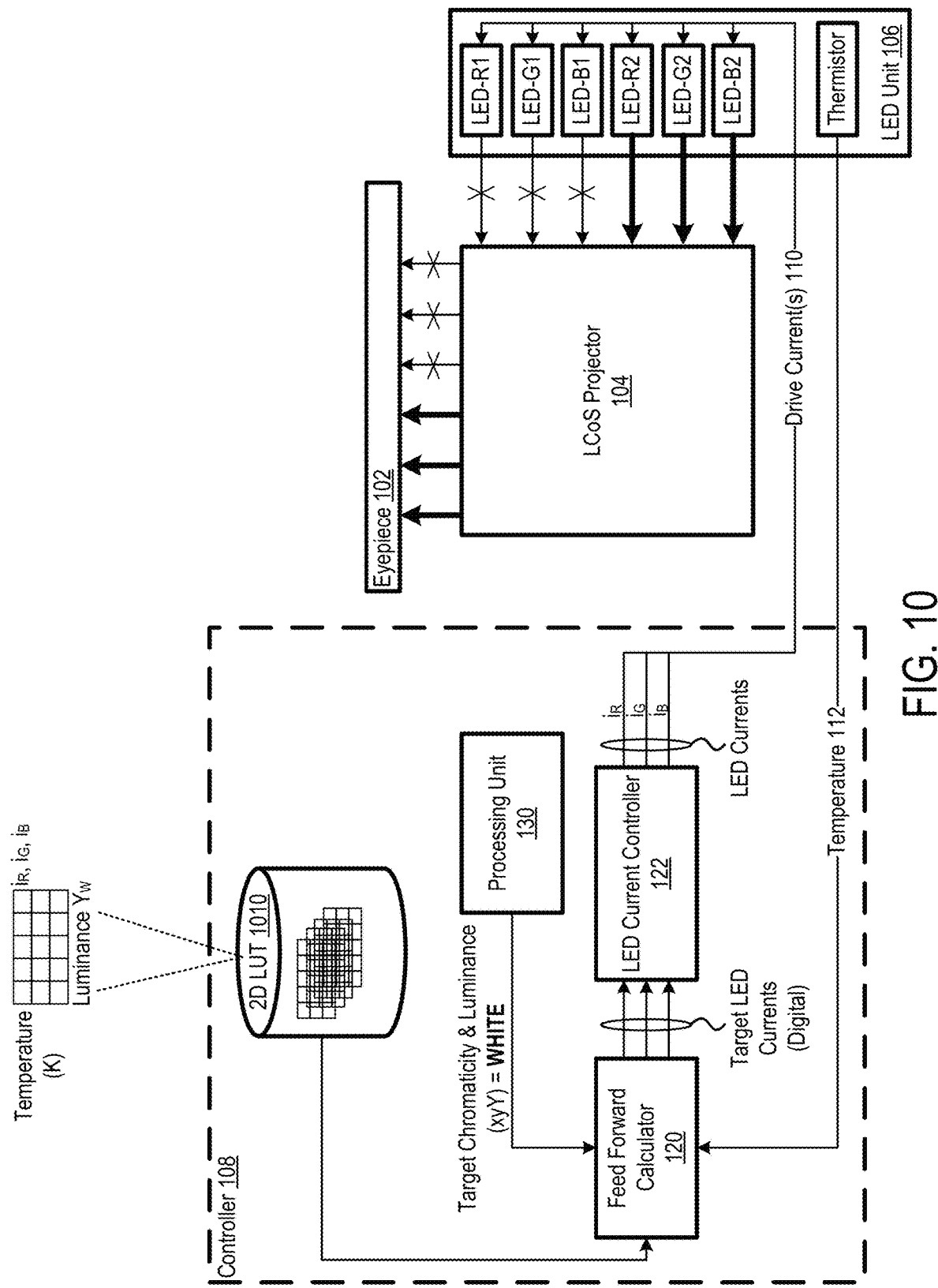
FIG. 10 illustrates a operation of a second set of primary LEDs of a display device that have been previously characterized to generate a 2D LUT.

FIG. 10 illustrates a operation of a second set of primary LEDs of display device 100 that have been previously characterized to generate 2D LUT 1010. When display device 100 is in actual use by a user, the second set of primary LEDs are operated by a process that includes measuring temperature 112, receiving a target luminance, accessing 2D LUT 1010 to determine currents $i_R$, $i_G$, and $i_B$, and driving the LEDs with the determined currents. As illustrated in FIG. 10, the operating temperature 112 of LED unit 106 is measured using the thermistor and provided to the feed forward calculator 120 and used in determining the drive current for the various LEDs, i.e., LED-R2, LED-G2, and LED-B2.

Figure 11:
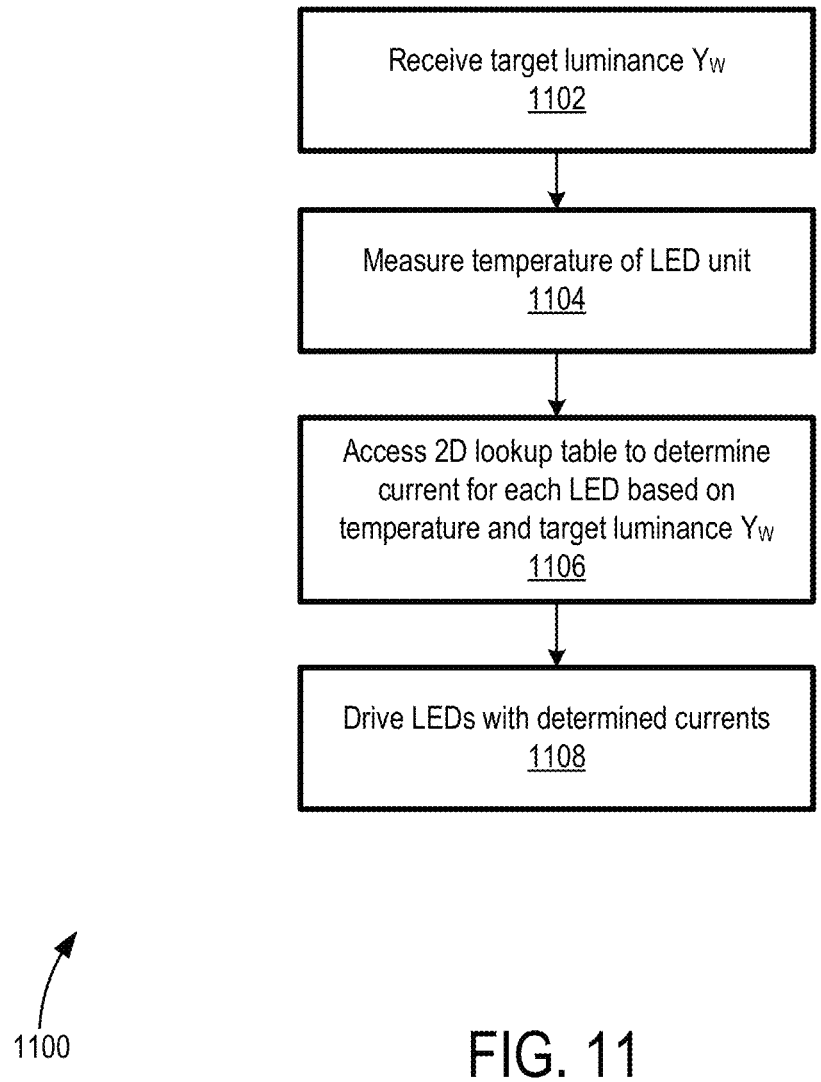
FIG. 11 illustrates a method for calibrating a display device.

FIG. 11 illustrates a method 1100 for calibrating a display device, such as display device 100. In some embodiments, method 1100 may be performed subsequent to performance of methods 700 or 800. One or more steps of method 1100 may be performed in a different order than that shown in FIG. 11, and not all steps need be performed. At step 1102, a target luminance $Y_W$ is received. The target luminance $Y_W$ may correspond to a particular white point, for example, D65. At step 1104, the temperature of the LED unit is measured. At step 1106, one or more 2D lookup tables are accessed to determine currents $i_R$, $i_G$, and $i_B$, which can be subsequently used to drive the primary color LEDs.

In step 1106, bi-linear interpolation can be used to determine the drive current for each LED, i.e., $i_R$, $i_G$, and $i_B$, as well as the chromaticity and luminance (i.e., x, y, and Y) for each of the LEDs. Accordingly, some embodiments determine 12 parameters: {$i_R$, $i_G$, $i_B$, $x_R$, $x_G$, $x_B$, $y_R$, $y_G$, $y_B$, $Y_R$, $Y_G$, $Y_B$}. To perform the bi-linear interpolation, the discrete LED unit temperatures and luminances used for the 2D look up tables are accessed and the neighboring indexes for the LED unit's temperature and the target luminance are found. For each of the 12 parameters, the respective 2D LUT is accessed, the four neighboring entries are found, and bi-linear interpolation is performed. At step 1108, the primary color LEDs are driven with the determined currents.

It should be appreciated that the specific steps illustrated in FIG. 11 provide a particular method of calibrating a display device according to another embodiment of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 12:
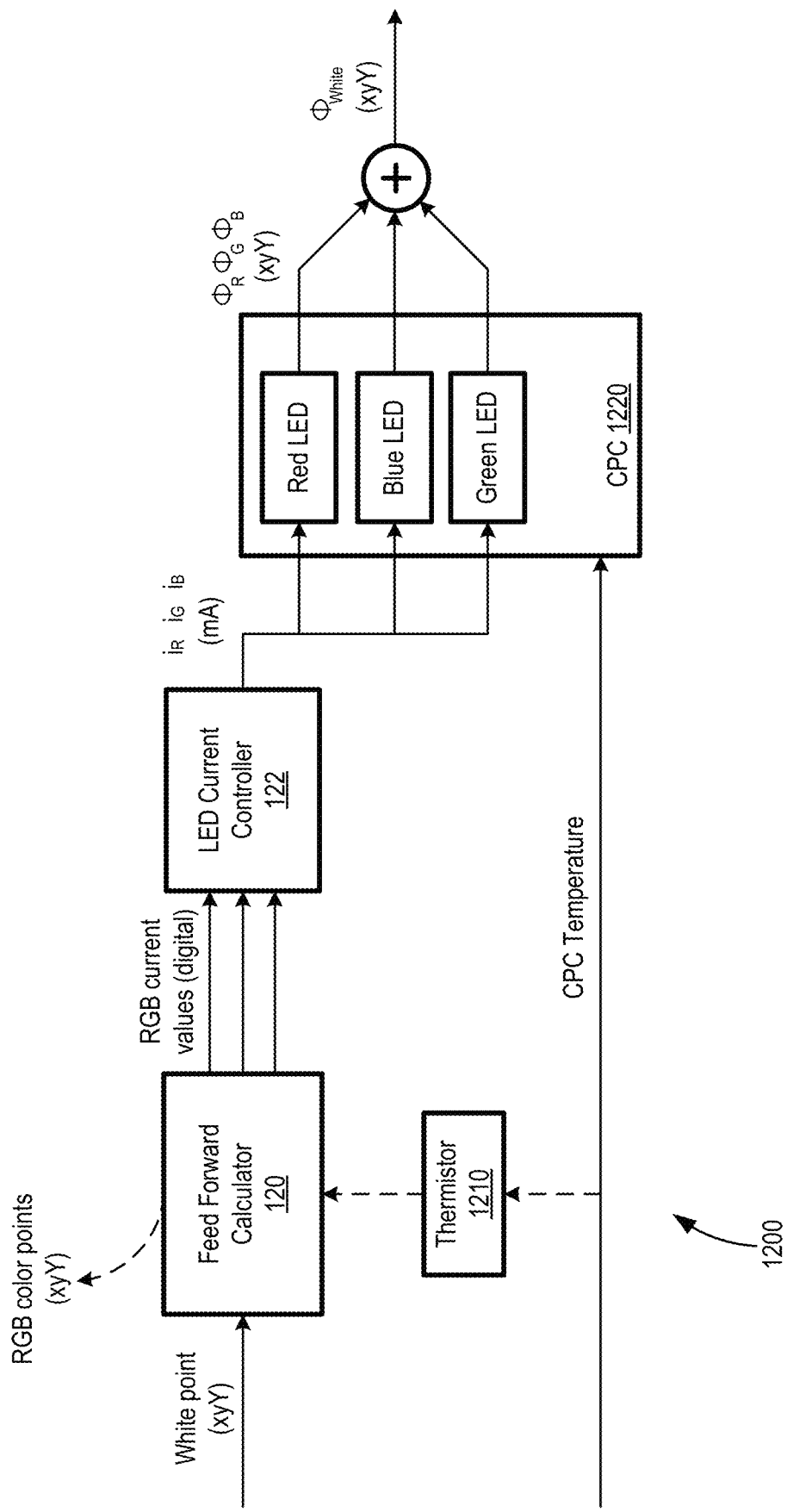
FIG. 12 illustrates a block diagram of a feed forward controller according to an embodiment of the present invention.

FIG. 12 illustrates a block diagram of a feed forward controller 1200 according to an embodiment of the present invention. Referring to FIG. 12, the inputs to feed forward controller 1200 are the target chromaticity and luminance in order to create a given virtual image (white point) and a disturbance, which is the measurement of the temperature of the LED package, also referred to as an LED unit. In FIG. 12, the LED package is referenced as CPC 1220 since the LED package can utilize CPCs. The thermal mass of the LED package can be used to facilitate temperature control as described more fully herein. As illustrated in FIG. 12, a thermistor 1210 is utilized to provide the temperature of CPC 1220 to feed forward calculator 120 although other temperature measurement devices can be utilized.

In certain ambient conditions, the temperature of the LED package can change during the time period during which the spectral characterization of the particular LED under test is being characterized. In this case, an average temperature during the test period can be computed.

As illustrated in FIG. 12, feed forward calculator 120 is able to provide RGB color points (e.g., in xyY color space) as an output. As described in relation to FIG. 8C, the 2D LUT can include not only drive current values, but chromaticity and luminance information for the LEDs at the drive currents of interest. Thus, this chromaticity and luminance information can be output for use by other system elements, for example, for conversion between color gamuts, for example, from a native color gamut to the sRGB color gamut.

The summation of the light emitted by the three LEDs occurs in the eye of the viewer in implementations in which field sequential display systems are utilized.

The following discussion illustrates one or more steps of the color calibration process as described herein. As discussed herein, the drive currents applied to the LEDs to achieve a particular white point (e.g., D65) may vary as the determined chromaticities for the red, green, and blue LEDs change as a function of temperature and drive current. For example, at a first time, a particular white point having a chromaticity coordinate of x=0.3127, y=0.329 may be generated according to the following table:

|   | Red | Green | Blue | White |
|---|---|---|---|---|
| x | 0.6972 | 0.154 | 0.1484 | 0.3127 |
| y | 0.3022 | 0.7681 | 0.029 | 0.329 |
| Y | 0.272 | 0.692 | 0.036 | 1 |

The calculated luminances for the red, green, and blue LEDs are listed in the bottom row and sum to the target luminance of the particular white point of 1.

Continuing with the above example, at a second time, the chromaticity coordinates for the red, green, and blue LEDs have changed (due to, e.g., a change in temperature) and the same white point having a chromaticity coordinate of x=0.3127, y=0.329 may be generated according to the following table:

|   | Red | Green | Blue | White |
|---|---|---|---|---|
| X | 0.6921 | 0.1143 | 0.1547 | 0.3127 |
| Y | 0.3035 | 0.7392 | 0.0209 | 0.329 |
| Y | 0.292 | 0.684 | 0.024 | 1 |

The calculated luminances for the red, green, and blue LEDs are listed in the bottom row and again sum to the target luminance of the particular white point of 1.

Continuing with the above example, at a third time the chromaticity coordinates for the red and green LEDs are the same as at the second time but the chromaticity coordinate of the white point has changed from x=0.3127, y=0.329 to x=0.3295, y=0.3679 (due to, e.g., a change in the desired virtual content). The white point may be generated according to the following table:

|   | Red | Green | Blue | White |
|---|---|---|---|---|
| x | 0.6921 | 0.1143 | 0.1484 | 0.3295 |
| y | 0.3035 | 0.7392 | 0.029 | 0.3679 |
| Y | 0.2923 | 0.6836 | 0.0241 | 1 |

The calculated luminances for the red, green, and blue LEDs are listed in the bottom row and again sum to the target luminance of the particular white point of 1.

It should be appreciated that the specific steps illustrated in the figures related to the methods described herein illustrate steps that provide the particular methods described herein. Other sequences of steps may also be performed according to alternative embodiments. For example, alternative embodiments of the present invention may perform the steps outlined above in a different order. Moreover, the individual steps illustrated in the figures related to the methods described herein may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 13:
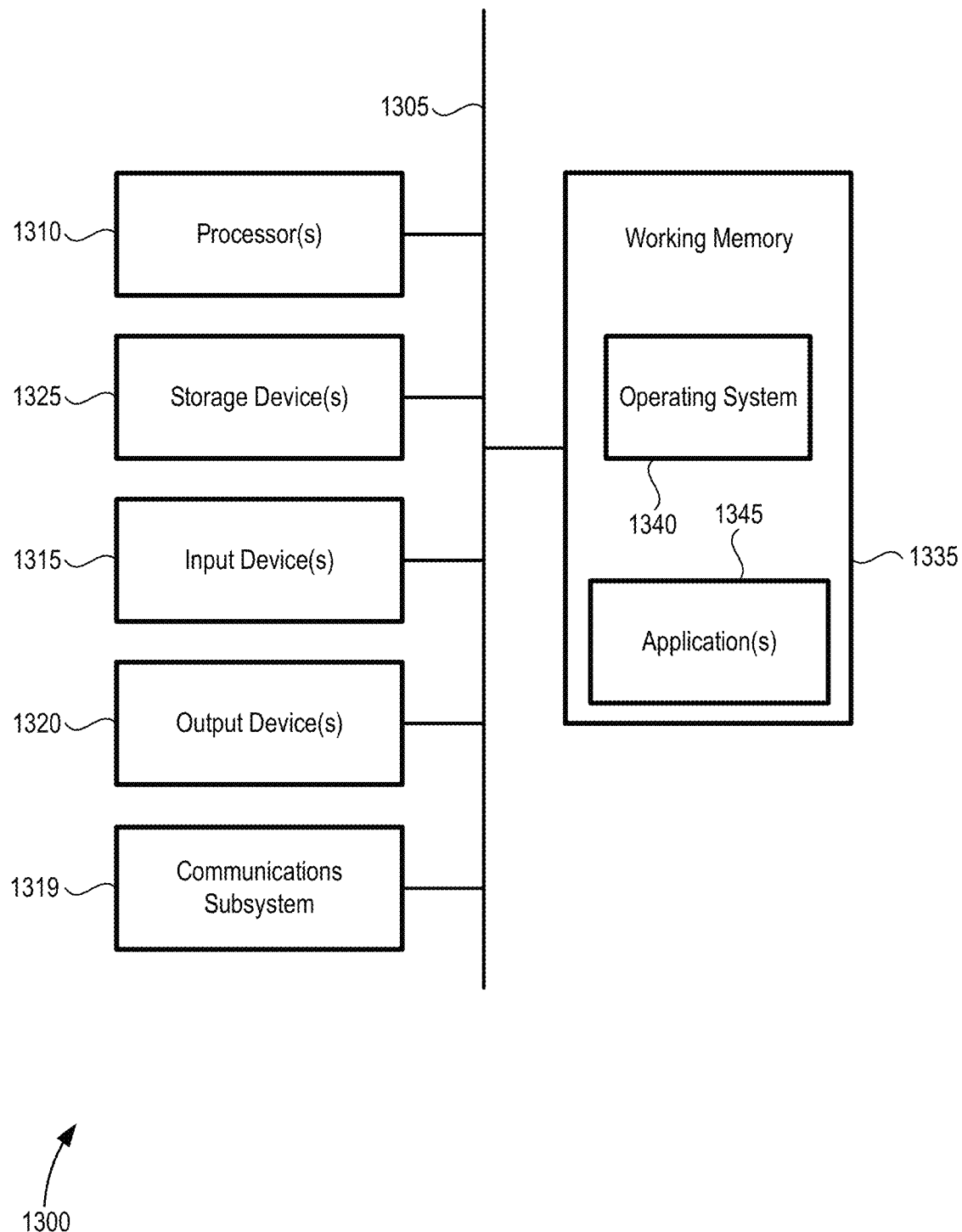
FIG. 13 illustrates a simplified computer system according to an embodiment described herein.

FIG. 13 illustrates a simplified computer system 1300 according to an embodiment described herein. Computer system 1200 as illustrated in FIG. 12 may be incorporated into devices such as display device 100 and calibration computer 202 as described herein. FIG. 13 provides a schematic illustration of one embodiment of computer system 1300 that can perform some or all of the steps of the methods provided by various embodiments. It should be noted that FIG. 13 is meant only to provide a generalized illustration of various components, any or all of which may be utilized as appropriate. FIG. 13, therefore, broadly illustrates how individual system elements may be implemented in a relatively separated or relatively more integrated manner.

Computer system 1300 is shown comprising hardware elements that can be electrically coupled via a bus 1305, or may otherwise be in communication, as appropriate. The hardware elements may include one or more processors 1310, including without limitation one or more general-purpose processors and/or one or more special-purpose processors such as digital signal processing chips, graphics acceleration processors, and/or the like; one or more input devices 1315, which can include without limitation a mouse, a keyboard, a camera, and/or the like; and one or more output devices 1320, which can include without limitation a display device, a printer, and/or the like.

Computer system 1300 may further include and/or be in communication with one or more non-transitory storage devices 1325, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1300 might also include a communications subsystem 1319, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1319 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1319. In other embodiments, a portable electronic device, e.g. the first electronic device, may be incorporated into computer system 1300, e.g., an electronic device as an input device 1315. In some embodiments, computer system 1300 will further comprise a working memory 1335, which can include a RAM or ROM device, as described above.

Computer system 1300 also can include software elements, shown as being currently located within the working memory 1335, including an operating system 1340, device drivers, executable libraries, and/or other code, such as one or more application programs 1345, which may comprise computer programs provided by various embodiments, and/or may be designed to implement methods, and/or configure systems, provided by other embodiments, as described herein. Merely by way of example, one or more procedures described with respect to the methods discussed above, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1325 described above. In some cases, the storage medium might be incorporated within a computer system, such as computer system 1300. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1300 and/or might take the form of source and/or installable code, which, upon compilation and/or installation on computer system 1300 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as computer system 1300 to perform methods in accordance with various embodiments of the technology. According to a set of embodiments, some or all of the procedures of such methods are performed by computer system 1300 in response to processor 1310 executing one or more sequences of one or more instructions, which might be incorporated into the operating system 1340 and/or other code, such as an application program 1345, contained in the working memory 1335. Such instructions may be read into the working memory 1335 from another computer-readable medium, such as one or more of the storage device(s) 1325. Merely by way of example, execution of the sequences of instructions contained in the working memory 1335 might cause the processor(s) 1310 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 1300, various computer-readable media might be involved in providing instructions/code to processor(s) 1310 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1325. Volatile media include, without limitation, dynamic memory, such as the working memory 1335.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1300.

The communications subsystem 1319 and/or components thereof generally will receive signals, and the bus 1305 then might carry the signals and/or the data, instructions, etc. carried by the signals to the working memory 1335, from which the processor(s) 1310 retrieves and executes the instructions. The instructions received by the working memory 1335 may optionally be stored on a non-transitory storage device 1325 either before or after execution by the processor(s) 1310.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of calibrating a display device including a set of primary color light sources disposed in a unit, the method comprising:
for each primary color light source of the set of primary color light sources, and for each target temperature of a set of target temperatures:
setting a drive current for the primary color light source to a target drive current;
setting drive currents for non-characterized primary color light sources of the set of primary color light sources, wherein the primary color light source is a characterized light source;
while repeatedly measuring a temperature of the unit, increasing or decreasing the drive currents for the non-characterized primary color light sources to drive the temperature of the unit to the target temperature such that the target temperature is achieved by modifying the drive currents for the non-characterized primary color light sources; and
obtaining measurement points including luminance values at the target temperature; and
using the measurement points to generate a database that provides target drive currents for the set of primary color light sources based on a measured temperature of the unit and a target luminance.

2. The method of claim 1, further comprising:
storing the database in a memory of the display device.

3. The method of claim 1, wherein the database is a lookup table.

4. The method of claim 1, wherein the set of primary color light sources are light-emitting diodes (LEDs).

5. The method of claim 1, wherein the unit comprises a compound parabolic concentrator (CPC).

6. The method of claim 1, wherein the measurement points further include chromaticity values.

7. The method of claim 6, wherein obtaining the measurement points includes measuring the chromaticity values and the luminance values by receiving light transmitted through an eyepiece of the display device.

8. A system for calibrating a display device including a set of primary color light sources disposed in a unit, the system comprising:
one or more processors; and
a non-transitory computer-readable medium comprising instructions that, when executed by the one or more processors, cause the one or more processors to perform operations comprising:
for each primary color light source of the set of primary color light sources, and for each target temperature of a set of target temperatures:
setting a drive current for the primary color light source to a target drive current;
setting drive currents for non-characterized primary color light sources of the set of primary color light sources, wherein the primary color light source is a characterized light source;
while repeatedly measuring a temperature of the unit, increasing or decreasing the drive currents for the non-characterized primary color light sources to drive the temperature of the unit to the target temperature such that the target temperature is achieved by modifying the drive currents for the non-characterized primary color light sources; and
obtaining measurement points including luminance values at the target temperature; and
using the measurement points to generate a database that provides target drive currents for the set of primary color light sources based on a measured temperature of the unit and a target luminance.

9. The system of claim 8, wherein the operations further comprise:
storing the database in a memory of the display device.

10. The system of claim 8, wherein the database is a lookup table.

11. The system of claim 8, wherein the set of primary color light sources are light-emitting diodes (LEDs).

12. The system of claim 8, wherein the unit comprises a compound parabolic concentrator (CPC).

13. The system of claim 8, wherein the measurement points further include chromaticity values.

14. The system of claim 13, wherein obtaining the measurement points includes measuring the chromaticity values and the luminance values by receiving light transmitted through an eyepiece of the display device.

15. A non-transitory computer-readable medium comprising instructions that, when executed by one or more processors, cause the one or more processors to perform operations comprising:
for each primary color light source of a set of primary color light sources, and for each target temperature of a set of target temperatures:
setting a drive current for the primary color light source to a target drive current;
setting drive currents for non-characterized primary color light sources of the set of primary color light sources, wherein the primary color light source is a characterized light source;
while repeatedly measuring a temperature of a unit in which the set of primary color light sources are disposed, increasing or decreasing the drive currents for the non-characterized primary color light sources to drive the temperature of the unit to the target temperature such that the target temperature is achieved by modifying the drive currents for the non-characterized primary color light sources; and
obtaining measurement points including luminance values at the target temperature; and
using the measurement points to generate a database that provides target drive currents for the set of primary color light sources based on a measured temperature of the unit and a target luminance.

16. The non-transitory computer-readable medium of claim 15, wherein the operations further comprise:
storing the database in a memory of a display device.

17. The non-transitory computer-readable medium of claim 15, wherein the database is a lookup table.

18. The non-transitory computer-readable medium of claim 15, wherein the set of primary color light sources are light-emitting diodes (LEDs).

19. The non-transitory computer-readable medium of claim 15, wherein the unit comprises a compound parabolic concentrator (CPC).

20. The non-transitory computer-readable medium of claim 15, wherein the measurement points further include chromaticity values.

* * * * *